(12) United States Patent
    Kananian et al.

(10) Patent No.: US 11,048,990 B2
(45) Date of Patent: Jun. 29, 2021

(54) RESONANCE-BASED INDUCTIVE COMMUNICATION VIA FREQUENCY SWEEPING

(71) Applicant: The Board of Trustees of the Leland Stanford Junior University, Stanford, CA (US)

(72) Inventors: Siavash Kananian, Stanford, CA (US); Ada Poon, Redwood City, CA (US); Simiao Niu, Stanford, CA (US); Zhenan Bao, Stanford, CA (US); Naoji Matsuhisa, Stanford, CA (US); George Alexopoulos, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/789,184

(22) Filed: Feb. 12, 2020

(65) Prior Publication Data
    US 2020/0257946 A1    Aug. 13, 2020

Related U.S. Application Data

(60) Provisional application No. 62/804,631, filed on Feb. 12, 2019.

(51) Int. Cl.
    *G06K 19/00*    (2006.01)
(52) U.S. Cl.
    CPC .................................. *G06K 19/00* (2013.01)
(58) Field of Classification Search
    None
    See application file for complete search history.

(56) References Cited

U.S. PATENT DOCUMENTS 9,588,002 B2    3/2017  Ingram et al.
9,625,330 B2    4/2017  Park et al.
                        (Continued)

OTHER PUBLICATIONS

S. Lizon-Martinez, R. Giannetti, J. L. Rodriguez-Marrero, and B. Tellini, "Design of a system for continuous intraocular pressure monitoring," IEEE Trans. Inst. & Meas., vol. 54, No. 4, pp. 1534-1540, Aug. 2005.

(Continued)

*Primary Examiner* — Adolf Dsouza
(74) *Attorney, Agent, or Firm* — Crawford Maunu PLLC

(57) ABSTRACT

One example is directed to a reader device having a first resonance circuit and being configured to interrogate one or more other remotely-located resonance circuits, each associated with a second resonance circuit which may be part of a passive sensor circuit. The first resonance circuit is operated to cause the inductively-coupled oscillating signal to be swept over a range of frequencies and therein cause a jump or sudden transition in a frequency of the oscillating signal while the first and second resonance circuits are in sufficient proximity for inductively-coupling via an oscillating signal via their respective resonance circuits. Sensing circuitry may be used to detect the jump or sudden transition in the frequency of the oscillating signal and, by way of or in response to an indication of timing and/or a set of inductively-related parameters, data is conveyed from the sensor to the reader device via the inductively-coupled oscillating signal.

23 Claims, 17 Drawing Sheets

(56) References Cited

U.S. PATENT DOCUMENTS

| | | | |
|---|---|---|---|
| 9,689,828 | B2 | 6/2017 | Bridges et al. |
| 9,733,202 | B2 | 8/2017 | Sexton |
| 10,037,098 | B2 | 7/2018 | Bao et al. |
| 10,545,058 | B2 | 6/2020 | Bao et al. |
| 2002/0121988 | A1 | 9/2002 | Lonsdale et al. |
| 2011/0259953 | A1* | 10/2011 | Baarman .............. G01F 23/20 235/375 |
| 2015/0289763 | A1 | 10/2015 | Morshed et al. |
| 2017/0270323 | A1* | 9/2017 | Butler .............. G06K 7/10198 |
| 2018/0036115 | A1 | 2/2018 | Smirnov |
| 2018/0116560 | A1* | 5/2018 | Quinn .............. A61B 5/6832 |
| 2020/0012008 | A1* | 1/2020 | Chen .............. G01D 5/2066 |

OTHER PUBLICATIONS

R. Nopper, R. Niekrawietz, and L. Reindl, "Wireless readout of passive LC sensors," IEEE Trans. on Instr. and Meas., vol. 59, No. 9, pp. 2450-2457, Sep. 2010.

R. Nopper, R. Has, and L. Reindl, "A wireless sensor readout system—circuit concept, simulation, and accuracy," IEEE Trans. on Instr. and Meas., vol. 60, No. 8, pp. 2976-2983, Aug. 2011.

Chen, P.Y., Sakhdari, M., Hajizadegan, M. et al. "Generalized parity—time symmetry condition for enhanced sensor telemetry." Nat Electron 1, 297-304 (2018). https-doi-org.stanford.idm.oclc.org/10.1038/s41928-018-0072-6.

Timothy J. Harpster et al. "A Passive Humidity Monitoring System for In Situ Remote Wireless Testing of Micropackages." Journal of Microelectromechanical Systems, vol. 11, No. 1, Feb. 2002, 61-67.

J. Coosemans et al. "A readout circuit for an intra-ocular pressure sensor." Sensors and Actuators A 110 (2004) 432-438.

Kyu Jin Cho and H. Hany Asada. "A Recursive Frequency Tracking Method for Passive Telemetry Sensors." Proceedings of the American Control Conference, Denver, CO, Jun. 4-6, 2003, 4943-4948.

Sajeeda and Todd J. Kaiser, "Passive Telemetric Readout System." IEEE Sensors Journal, vol. 6, No. 5, Oct. 2006, 1340-1345.

E. Tonolia et al. "Piezoelectric Resonant Sensors with Contactless Interrogation for Mass-Sensitive and Acoustic-Load Detection." Procedia Engineering 47 ( 2012 ) 442-445.

Lisa Y. Chen et al. "Continuous wireless pressure monitoring and mapping with ultra-small passive sensors for health monitoring and critical care" Nature Communications, Oct. 2014, 1-10.

Qiuxu Wei et al. "A Novel Method Based on RF Detection Enabling Wireless and Passive LC Sensing." IEEE 2016, 3 pgs.

Marco Demori et al. "Electronic technique and circuit topology for accurate distance-independent contactless readout of passive LC sensors." Int. J. Electron. Commun. (AEÜ) 92 (2018) 82-85.

P. Escobedo et al. "Compact readout system for chipless passive LC tags and its application for humidity monitoring." Sensors and Actuators A 280 (2018) 287-294.

Carvajal et al. "Readout Circuit With Improved Sensitivity for Contactless LC Sensing Tags." IEEE Sensors Journal, vol. 20, No. 2, Jan. 15, 2020, 885-891.

Zhenya Dong et al. "Sensitive readout of implantable microsensors using a wireless system locked to an exceptional point." Nature Electronics, vol. 2, Aug. 2019, 335-342.

* cited by examiner

FIG. 5B
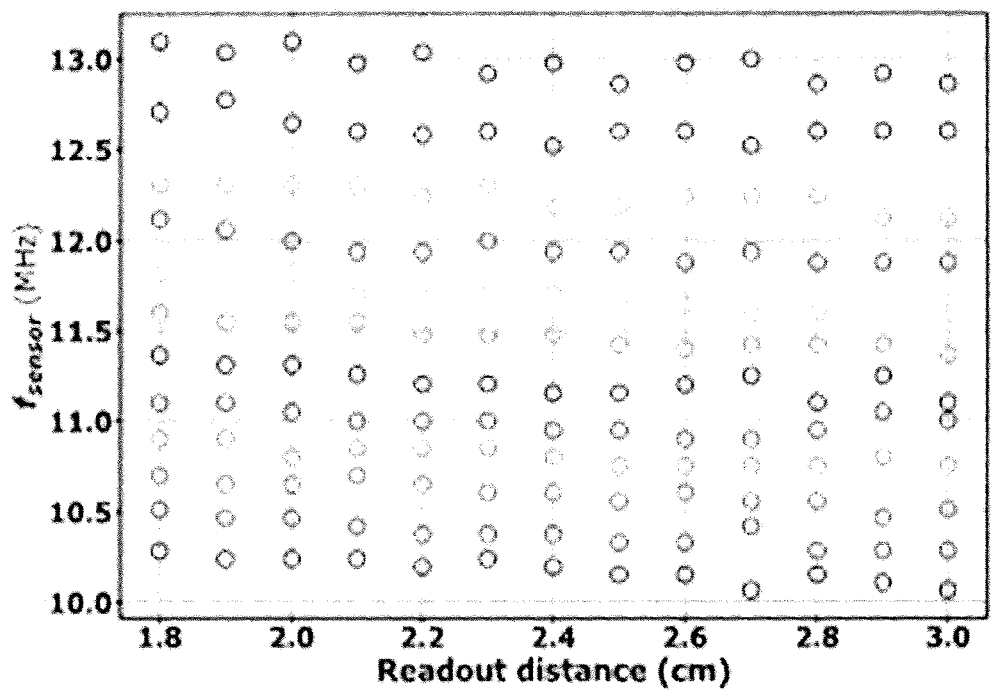
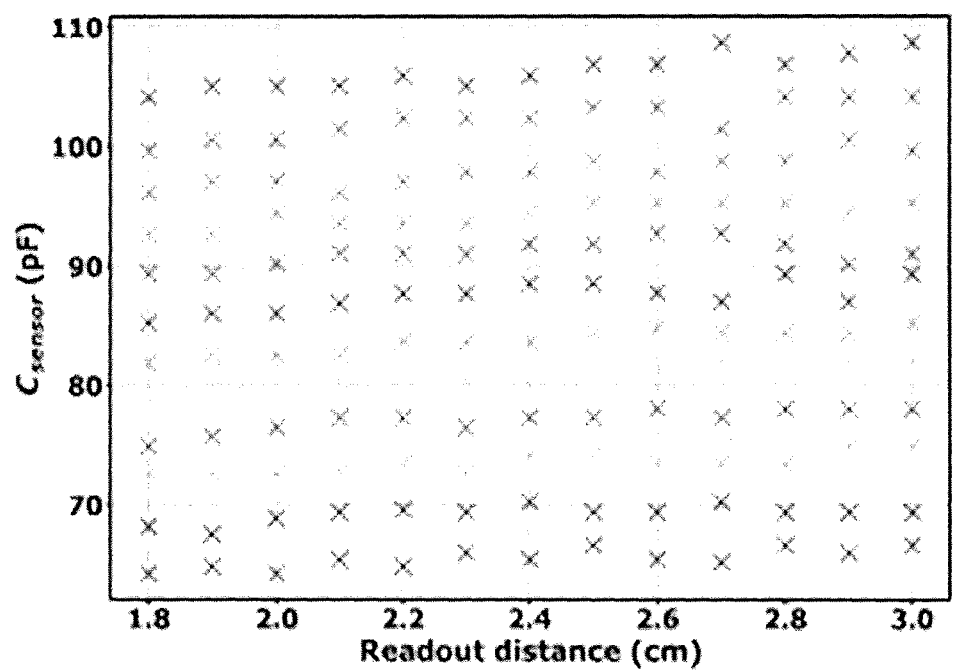
FIG. 5C

RESONANCE-BASED INDUCTIVE COMMUNICATION VIA FREQUENCY SWEEPING

BACKGROUND AND OVERVIEW

Aspects of the present disclosure are directed to systems, apparatuses, and methods involving a resonance circuit configured to readout data from another resonance circuit in a coupling-insensitive manner.

Remote sensing systems are used in a variety of fields and for a variety of applications to provide remote sensing and data telemetry. Such systems may include one more sensor circuits in communication with a reader apparatus. In such systems, the sensor circuits can be active or passive sensors, and in some instances, can be wearable or stretchable. Active sensors have an energy source, such as a battery or circuitry that performs wireless energy processing, and can communicate with the reader apparatus using transceiver circuitry located on the active sensor. Passive sensors can contain information in their resonance frequency, and may not have a power source, which can lower the cost and complexity compared to active sensors.

There have been advances in the design of fully-passive sensors which have reduced their expense and have provided simpler designs. However, the design of a wireless, energy-efficient, handheld, and simple external reader to interrogate the sensor remains challenging.

In connection with such advancements, one way to perform sensor readout is based on magnetic coupling through a coil to the sensor and measuring the input impedance of the system. Some designs of this type employ lab equipment, such as a vector network analyzer or impedance analyzer, to directly characterize the input impedance profile and observe the resonance frequency, but such lab equipment bulky is bulky and expensive. Moreover, for many applications, such as point-of-care/bedside sensing functionality, this type of system and technique can be highly prohibitive and impractical.

Another such advancement is of the type that employ complicated electronic circuits to use the information in the amplitude of the coupled signal to perform the measurement, but this type also has issues. Even where such a technique might be simpler and more energy efficient, there is a major limitation in that the devices are sensitive to the distance between the sensor the readout coil, and hence sensor readout is heavily distance-dependent. Complicated correction techniques may be required on top of the radio transceiver to make distance-independent measurements, and this requires the addition of further circuitry which further complicates the reader architecture and largely undermining the purpose of a handheld system. Accordingly, such systems are often designed with compromised readout accuracy (independent of distance) and/or with both overly-complex readers and excessive consumption of power.

In the following discussion, various implementations and applications are disclosed to provide an understanding of the instant disclosure by way of non-limiting example embodiments.

Certain embodiments in accordance with the present disclosure are directed to circuit-based apparatuses and related methods involving a communication and/or sensing apparatus that addresses one or more of the above (and other) challenges and provides a balance in terms of readout accuracy and reductions in terms of reader complexity and power consumption.

One embodiment in accordance with the instant disclosure is directed to an apparatus, a method for using such an apparatus that includes a first resonance circuit having a first inductive element or circuitry and a second resonance circuit having a second inductive element or circuitry. The first and second resonance circuits are communicatively coupled via the first and second inductive elements or circuitry by way of an inductively-coupled oscillating signal. The first resonance circuit is configured and arranged to cause the inductively-coupled oscillating signal to be swept over a range of frequencies and therein cause a jump or sudden transition in the oscillating signal while the first and second resonance circuits are (e.g., in proximity for) inductively-coupling the oscillating signal. The apparatus further includes sensing circuitry configured to detect the jump or sudden transition in the oscillating signal, and in response to indicate timing, and/or a set of inductively-related parameters, for data to be obtained via the inductively-coupled oscillating signal.

More specific embodiments are directed to a reader apparatus having a resonance circuit and negative resistance circuitry (e.g., active transistor circuitry with gain) such that the reader apparatus interrogates or reads-out data from sensor circuitry in a coupling insensitive manner. The negative resistance circuitry is in parallel with or in series with the resonance circuit, in various embodiments. The negative resistance circuitry configured and arranged with the resonance circuit such that the resonance circuit exhibits the gain. In various embodiments, the resonance circuit and the negative resistance circuit form an oscillator core (i.e., the reader) which may couple with the sensor circuitry obtain data, such as a sensor-obtained measurement. The reader apparatus can sweep the resonance frequency of the oscillator to obtain resulting frequency measurements and to detect a jump or (sharp) transition in the frequency measurement, the resonant frequency at which the jump occurs or is otherwise associated with is used to obtain the data from the sensor circuitry.

Other embodiments are directed to remote sensing systems and/or methods that include the above-described apparatus operating similar to or as a reader and at least one sensor circuitry. The sensor circuitry has the different resonance circuit configured and arranged to exhibit loss. One such embodiment involves a (reader-like) device having a first resonance circuit and being configured to interrogate one or more other remotely-located resonance circuits, each associated with a second resonance circuit which may be part of a passive sensor circuit. The first resonance circuit is operated to cause the inductively-coupled oscillating signal to be swept over a range of frequencies and therein cause a jump or sudden transition in a frequency of the oscillating signal while the first and second resonance circuits are in sufficient proximity for inductively-coupling via an oscillating signal via their respective resonance circuits. Sensing circuitry may be used to detect the jump or sudden transition in the frequency of the oscillating signal and, by way of or in response to an indication of timing and/or a set of inductively-related parameters, data is conveyed from the sensor to the reader device via the inductively-coupled oscillating signal.

Yet other embodiments are directed to remote sensing systems and/or methods that operate with a reader and one or more sensors, each sensor including or being associated with a tank circuit having RLC values for resonating with a resonant circuit in a reader at a certain sensor-specific frequency (or range of frequencies). For each such sensor, the sensor-specific frequency is detected by the reader and may be used with a look-up table LUT) storing preprogrammed data to indicate a default condition of the sensor, where the default condition indicates when the sensor is not sensing or detecting a change in the targeted environment (e.g., a change in pressure due to heartbeat or chemistry/temperature due to food spoilage). When the sensor responds to such a change in the targeted environment, because the "C" (and in some instance also the "L") of the sensor's RLC is used to sense the change, the reader detects this change by recognizing that the default frequency or frequencies at which the sensor resonates has changed (e.g., shifted). Such a change is associated with a specific and unique resonance-frequency range for which the sensor is designed by way of the RLC design, and thereby not becoming confused by another sensor working with the same reader in the system or by another system's sensor. In any one system having a reader for one or more sensors with differently-set resonance frequencies, for each sensor there is a resonance frequency (or frequency range) associated with the sensor's RLC (e.g., with C being variable in a range for sensing) so that the sensor—specific resonance frequency (or frequency range) uniquely identifies the corresponding sensor in the system.

Further embodiments are directed to embodiments associated with only the reader as opposed to the sensor and others directed to embodiments associated with only one or more sensors for use with a reader as opposed to the reader. As an example, in the former situation focusing on only the reader, the reader may be designed to operate as exemplified herein and with its resonance circuitry designed for and relative to commercially-available sensors. In this example, the sensors are characterized for their ability to resonate when in proximate of the reader in conditions associated with the sensors not sensing changes in the targeted environment and also in conditions associated with when the sensors are sensing changes in the targeted environment.

In other specific embodiments, the above described apparatuses and systems can be used to perform a variety of methods. An example method includes obtaining measurements of a self-oscillating frequency, detecting a jump in the measured self-oscillating frequency, and/or to obtaining data from the passive sensor circuitry at the (resonance) frequency associated with the detected jump.

Yet further specific examples concern embodiments which are based on continuous wave frequency measurements to obviate needs for a complex front-end circuit which would measure input impedance and/or pulse a transmitter of the reader. Frequency mode splitting may also be used independent of a coupling factor between the sensor and the reader, and hence frequency reading, in such cases, is insensitive to the distance (e.g., up to a distance determined by the dimensions of the coils and the quality factor), while obviating needs for power-hungry and complex readout circuitry.

The embodiments and specific applications discussed herein may be implemented in connection with one or more of the above-described aspects, embodiments and implementations, as well as with those shown in the figures. This description and the various embodiments are presented by way of the accompanying Experimental/More Detailed Embodiments section.

BRIEF DESCRIPTION OF FIGURES

Various example embodiments may be more completely understood in consideration of the following detailed description in connection with the accompanying drawings, in which:

FIGS. 5A-5D shows a more specific example of an experimental implementation of a type of reader (FIG. 5A) and with graphs (FIGS. 5B, 5C and 5D) showing measurement data obtained via experiments using a reader consistent with the reader of FIG. 5A and consistent with other embodiments of the present disclosure;

Figure 1A:
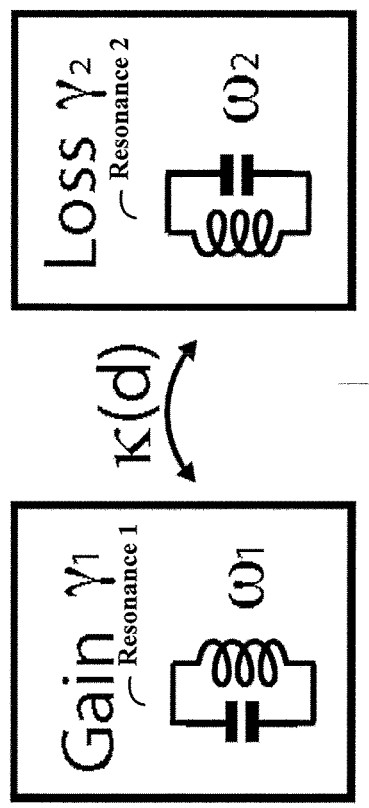
FIGS. 1A-1B show example remote sensing systems having reader apparatuses, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving a resonance circuit that provides for reading or interrogation of data from another resonance circuit. While not necessarily so limited, various aspects may be appreciated through a discussion of examples using this context and more specifically directed to a remote reader apparatus that includes a resonance circuit coupled to negative resistance circuitry and which is configured to read or interrogate passive sensor circuitry in response to detecting a jump or sudden transition (indicative of a resonance condition) in a frequency sweep of a signal inductively coupled between the reader and sensor circuits. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Specific examples consistent with the instant disclosure are directed to embodiments involving remote reader apparatuses and/or remote sensing systems to provide contactless sensing and data telemetry, and which may enable a wide range of applications. In more specific embodiments, such a sensing system, herein generally referred to as "remote sensing system," may include one or more sensor circuits in communication with a reader apparatus. Such a practical reader solution can be ultra-low-power, simple, and potentially hand-held or wearable. In many applications, such a reader solution can utilize simple measurement techniques in order to eliminate the need for bulky and expensive external equipment for analysis. The system employs passive sensor circuits that reduce complexity, cost, and power consumption. And, such systems operate in a manner that avoids the needs and limitations of optimizing frequency and distance/orientation for efficient power and/or data transfer.

Various embodiments of the instance disclosure are directed to discoveries concerning wireless communication parameters useful for conveying information from one inductive conductor to another. Such communication parameters include mismatching frequency/phase due to difference between the gain and loss exhibited by the coupled inductive conductors and that can be caused by changes in distance between the coupled inductive conductors. As a specific example, the coupled inductors, which have had symmetry in (resonance) frequency prior to the change in distance, have asymmetric frequencies due to difference between the gain and loss caused by the changed distance.

Certain aspects of the instant disclosure are directed to bed-side and point-of-care health monitoring and sensing by using a reader as part of the sensing system to realize a fully-functional system for sensing bio-pressures such as blood pressure and heartbeats, sweat and temperature (using resistive sensors), and in some instances tracking body movements for sleep studies. As may be appropriate, the sensors can be manufactured using stretchable materials that are consistent with wearable/disposable electronics. The reader can be a hand-held device which the user can directly point to the sensor to do the measurement or can be placed in the user's surroundings. As examples, the reader can be embedded in the mattress for sleep monitoring or sleep study applications, and the reader can be configured to interface via the Internet Cloud (using legacy technologies, such as BLE or WiFi) or interface to an edge device, such as a cellphone (using either BLE, WiFi or sound waves), so that the healthcare provider can have real-time access to patients health records.

In a specific non-limiting example consistent with the instant disclosure, an apparatus such as a pair of remotely-coupled devices in a system, includes a first resonance circuit having a first inductive element or circuitry, and a second resonance circuit having a second inductive element or circuitry. The first and second resonance circuits are communicatively coupled via the first and second inductive elements (e.g., inductor "L" in an RLC circuit) or inductive circuitry by way of an inductively-coupled oscillating signal. The first resonance circuit is configured and arranged to cause the inductively-coupled oscillating signal to be swept over a range of frequencies (e.g., using a varactor/potentiometer as part of the RLC circuit) and therein cause a jump or sudden transition in the oscillating signal while the first and second resonance circuits are (e.g., in proximity for) inductively-coupling the oscillating signal. In connection with the above-noted discoveries, this jump or transition is used to discern timing or resonant/inductively-related parameters for conveying information via the inductive coupling between the first and second resonant circuits. The jump or transition is then detected in sensing circuitry, with the sensing circuitry being configured to detect parameters (e.g., frequency, phase and/or signal amplitude). Using this jump or transition to indicate timing and/or related conditions, data is obtained therefrom via the inductively-coupled oscillating signal. As might be appreciated, for bio-sensing applications, the first resonance circuit may be implemented as a "reader" and the second resonance circuit may be implemented as a (bio) sensor (e.g., wearable device such as a smartphone, a chest or heart monitor, and/or another device such as smartwatch on the wrist which is configured to sense physiological parameters such as sleep-related data, heartrate, blood oxygen levels, pulse-wave sensing).

The above and other specific embodiments can be implemented using active and/or passive circuits in or at one or both the first/second resonance circuit(s). For example, the sensor (as the second resonance circuit) may use an active circuit (e.g., with a power source such as a battery) or as a passive circuit (e.g., to minimize space/maintenance and number of circuit elements). Using passive sensors in certain of these specific embodiments are advantageous as they can be implemented using an asymmetric link to compensate for lack of versatility, and they can be made to be disposable, bio-degradable, and stretchable. Advantages are realized for conveying data in conjunction with the above-referenced jump in the signal (between such moving-target resonance circuits) by use of a passive sensor(s) with a reader that obtains data based on the timing and/or related conditions indicated by the jump. Such advantages can be particularly useful for sensing applications such as wearables as may be used/secured adjacent a user's skin or tissue, under, with, or on top of clothing (e.g., worn) and/or as biomedical monitoring devices such as biomedical implants.

Another specific example of a wearable, according to embodiments of the instant disclosure, is directed to a reader for interrogating a set of sensors, each sensor including one or multiple electrodes attached to a regions of the users chest/limbs and while being inductively coupled to the reader for simultaneously capturing the heart's activity as in an electrocardiogram (ECG). The set of sensors (e.g., from two to twelve), with their respective electrodes, provide the desired chest-monitoring electronics for electrocardiographic monitoring and recording. This arrangement, with the reader in proximate distance for the interrogation, may be used to continuously record the beats of a user's heart while the sensors, with their respective electrodes, are adhered to the user's chest (e.g., from a few days to several weeks at a time).

Certain embodiments in accordance with the present disclosure are directed to near-field, magnetically-coupled approach based on the physics and theory of quantum coupled resonance circuits. When two resonance circuits, such as one implemented in above-described reader apparatus and the other in the sensor circuitry, strongly couple, the resulting system exhibits two resonant modes whose frequencies depend on the value of k. Once the loss in one resonance circuit (explicit resistance or intrinsic loss due to limited component Q) is balanced with equal gain (negative resistance) in the other, an oscillator is formed. This oscillator automatically operates in a regime where two possible frequency modes (one per resonance circuit) can exist, one above and one below the natural resonance frequency.

In a detailed implementations and from a scientific perspective, the two frequency modes can be expressed as:

$$\omega_{self}(k) = \omega_0 \pm \sqrt{k^2 - \frac{1}{Q_{sensor}^2}}, k > k_{min} \propto \frac{1}{Q_{sensor}},$$

and which can occur with equal probability. Above $k_{min}$, the mode-splitting phenomenon can occur independent of k, and, as sensor and reader separation distance and orientation vary, $\omega_{self}(k)$ automatically adjust such that power and data are transferred at the most efficient frequency. While $k_{min}$ is still Q-dependent, experimental embodiments measurements show that this method allows for an extended operating range on the order of tens of cm (determined by the dimensions of the coils and the quality factor) in the 13.56-MHz industrial, scientific, and medical radio (ISM) frequency band. This can be scaled to higher frequency ISM bands depending on the size or bandwidth requirements of the specific application.

In an example embodiment, involving the above-noted first and second resonance circuits implemented as an RLC-based reader apparatus communicatively coupled to an RLC-based sensor, the reader apparatus can be used to employ data transfer via a capacitive shifting technique or a resistive shifting technique. For capacitive shifting, the two resonance circuits are purposefully frequency-mismatched by $\Delta\Omega = \omega_{reader} - \omega_{sensor}$ in which case only one of the two modes emerges depending on the sign $\Delta\Omega$. The reader apparatus can perform a technique of sweeping the resonance frequency of the reader apparatus, using a varactor (or alternatively/additionally another aspect of the RLC such as a potentiometer), and detecting a frequency jump, $\Delta\omega$, in the self-oscillating frequency and which indicates that the resonance frequency of the reader apparatus and the sensor apparatus match. This method may be considered coupling-independent because, regardless of the value of k, the self-oscillating frequency experiences a jump when $\omega_{reader} = \omega_{sensor}$. Such techniques can be used with parity time (PT)-asymmetric electronics by taking advantage of the asymmetry, as further described herein. The following disclosure refers to the first resonance circuit and second resonance circuit, respectively, as a reader apparatus and sensor circuitry, however embodiments are not so limited and can include a variety of different types of circuits as the first and second resonance circuits.

Other embodiments are directed to a remote sensing system that includes the above-described reader apparatus and at least one sensor circuitry (e.g., a passive sensor) and/or methods of using the same. The sensor circuitry has the different resonance circuit that exhibits loss. An example method includes obtaining measurements of a self-oscillating frequency, detecting a jump in the measured self-oscillating frequency, and/or obtaining data from the sensor circuitry at a frequency (e.g., resonance frequency of the reader apparatus) associated with the detected jump.

Figure 1B:
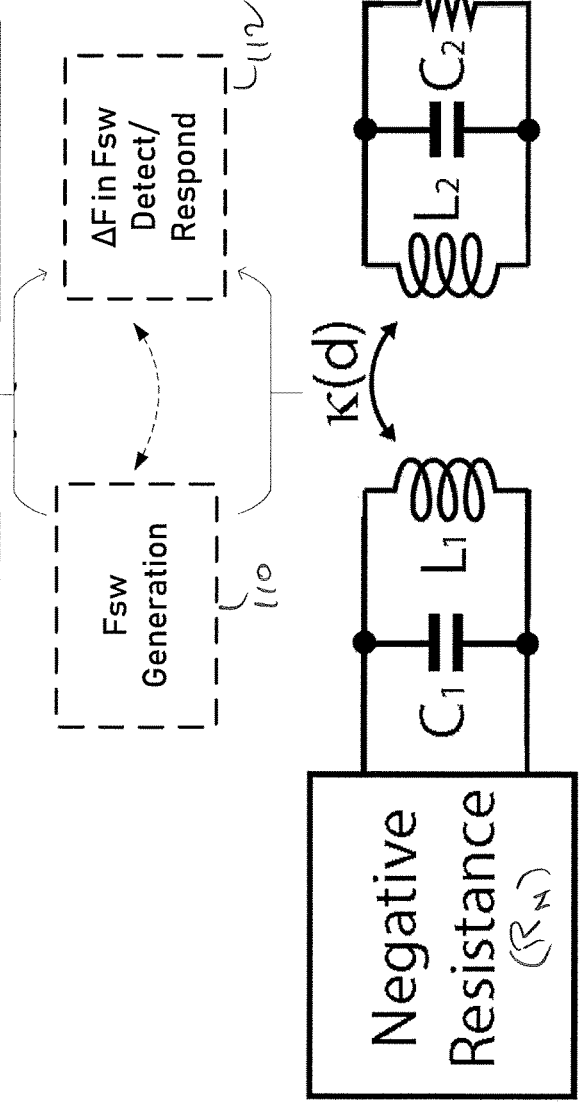

Turning now to the figures, FIGS. 1A-1B show example remote sensing systems having reader apparatuses, consistent with embodiments of the present disclosure. The remote sensing system is formed by coupled resonance circuits, such as resistor, inductor, capacitor (RLC) circuits, that form part of the reader apparatus and the sensor circuitry. As may be appreciated, an RLC circuit in an electrical circuit having a resistor, an inductor, and capacitor connected in series or in parallel. The remote sensing system, as illustrated by FIGS. 1A-1B can be used to transfer data via capacitive and/or resistive shifting, as above, and in which the transfer data techniques are coupling-independent. In various embodiments, the system can include more than one sensor circuitry, where each added sensor circuitry contributes an additional frequency mode, providing further degrees of freedom.

More specifically, FIGS. 1A and 1B show a respective reader 102 or 104 that has a resonance circuit which exhibits gain (due to negative resistance—R) associated with sensor circuitry 106 or 108 (which may be passive or active) which has a corresponding resonance circuit that exhibits loss (due to resistance R). The resonance circuit of the reader 104 is depicted as $R_N L_1 C_1$ and the resonance circuit of the sensor 108 is depicted as $R_2 L_2 C_2$. The two resonance circuits are associated with frequencies $\omega_1$ (e.g., resonance frequency of the reader apparatus) and $\omega_2$ (e.g., resonance frequency of the sensor circuitry) and are coupled through a distance and orientation-dependent coupling factor, κ. Within the reader 102 or 104 (or alternatively within the sensor), a frequency-signal generation circuit 110 is used to provide signal with a frequency which varies (e.g., is swept) over a range to effect resonance between the inductively-coupled resonance circuits. Within the sensor 106 or 108 (or alternatively within the reader), a detection circuit 112 may be used to detect a jump or sudden transition in the frequency of the inductively-coupled frequency-varying signal which is indicative of a resonance frequency between the reader and the sensor.

This resonance frequency may then be used for conveying data between the reader and the sensor, such as data sensed by the sensor to the reader, via an inductively-coupled signal sent via this resonance frequency. For example, in a system having a reader operating in such manner with a particular sensor which does not include additional circuitry for communicating data (e.g., by modulating the carrier or by way of a side channel), this particular sensor communicates the data by way of resonating at the resonance frequency detected by the reader. For such sensor embodiments using capacitive sensors, the capacitance part of the tank (RLC) circuit effects a change which in turn will shift the sensor's resonance frequency. The data is thereby conveyed at the time the reader measures the resonance frequency. In other examples where a particular sensor includes additional circuitry for communicating data, the shift in the sensor's resonance frequency is detected by the reader to initiate further communication by way of the additional circuitry.

The resonance circuit of the reader 102 or 104 exhibits gain, with a rate of $\gamma_1 > 0$, while the resonance circuit of the sensor 106 or 108 exhibits loss, with a rate of $\gamma_2 < 0$. The gain/loss parameter, $\gamma_i$ defines the degree of non Hermiticity upon which the eigenmodes are dependent. The governing equations of the two resonance circuits may be written using couple-mode theory (CMT) formalization as:

$$\frac{d}{dt}\begin{bmatrix} a_1 \\ a_2 \end{bmatrix} = iH \begin{bmatrix} a_1 \\ a_2 \end{bmatrix}, \quad (1)$$

where H is the Hamiltonian:

$$H = \begin{bmatrix} \omega_1 - i\gamma_1 & -\kappa \\ -\kappa & \omega_2 - i\gamma_2 \end{bmatrix} \quad (2)$$

If the (passive) sensor circuitry is in isolation, e.g., when $\kappa = 0$, then $$\frac{da_2}{dt} = (i\omega + \gamma_2)a_2 \quad (3)$$

Here, $\gamma_2$ is the frequency-normalized decay rate (RC damping constant) due to loss, $$\gamma_2 = -\frac{1}{\zeta_{RC}\omega_2} = -\frac{\sqrt{L_2 C_2}}{2R_2 C_2} = -\frac{1}{2R_2}\sqrt{\frac{L_2}{C_2}},$$

and $R_2$ models either an explicit resistance or the internal resonance loss (due to limited inductor and capacitor quality factor). Similarly, in resonance circuit 1 (of the reader apparatus), the gain factor is, $$\gamma_1 = -\frac{1}{\zeta_{RC,1}\omega_1} = -\frac{1}{2R_1}\sqrt{\frac{L_1}{C_1}},$$

where $R_1 < 0$. This negative resistance allows for functionality of the system and can, in many embodiments, be implemented using an amplifier with positive feedback.

FIG. 1B illustrates the specific example of a reader apparatus with an RLC circuit as coupled to the negative resistance circuit. As further illustrated by FIG. 1B, the reader apparatus can be coupled to the sensor apparatus via another RLC circuit having the loss. The negative resistance circuit can include an amplifier with positive feedback, such as a pair of cross-coupled transistors. The negative resistance circuit can be in parallel with or in series with the resonance circuit in various embodiments. The reader apparatus and the sensor circuitry form an oscillator with two possible resonant frequencies, as further described herein.

Figure 2A:
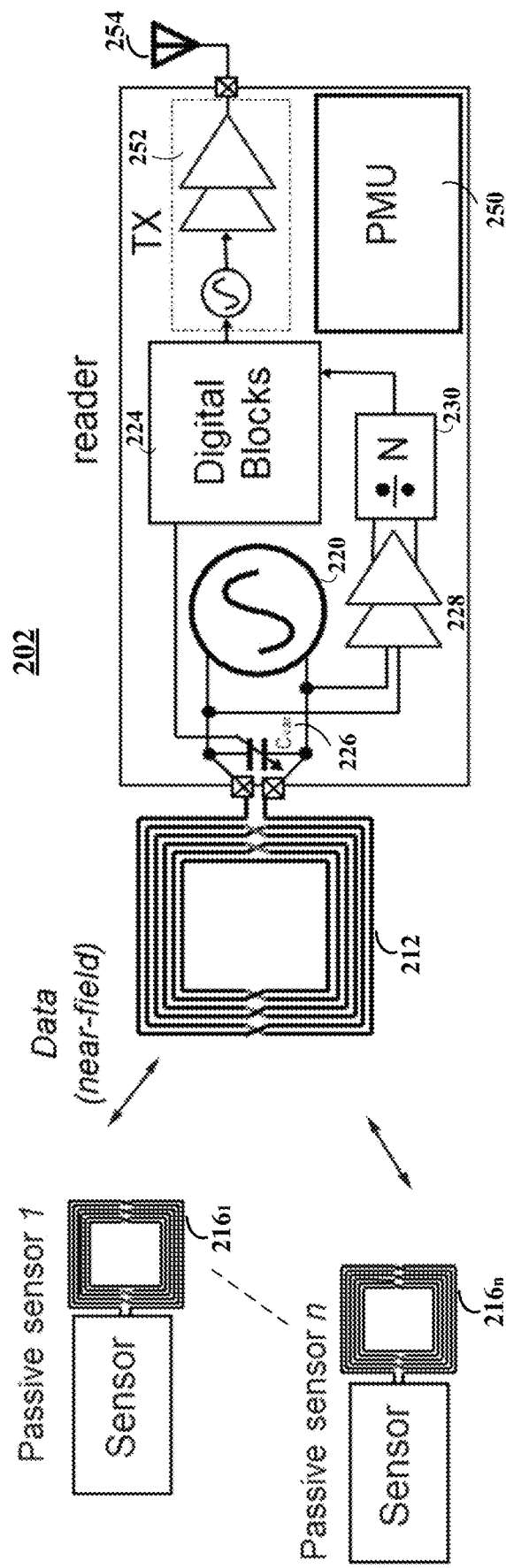
FIGS. 2A, 2B, 2C and 2D shows examples of more specific reader apparatuses, each involving a detected frequency jump in a swept frequency signal, consistent with aspects and embodiments of the present disclosure.
Figure 2B:
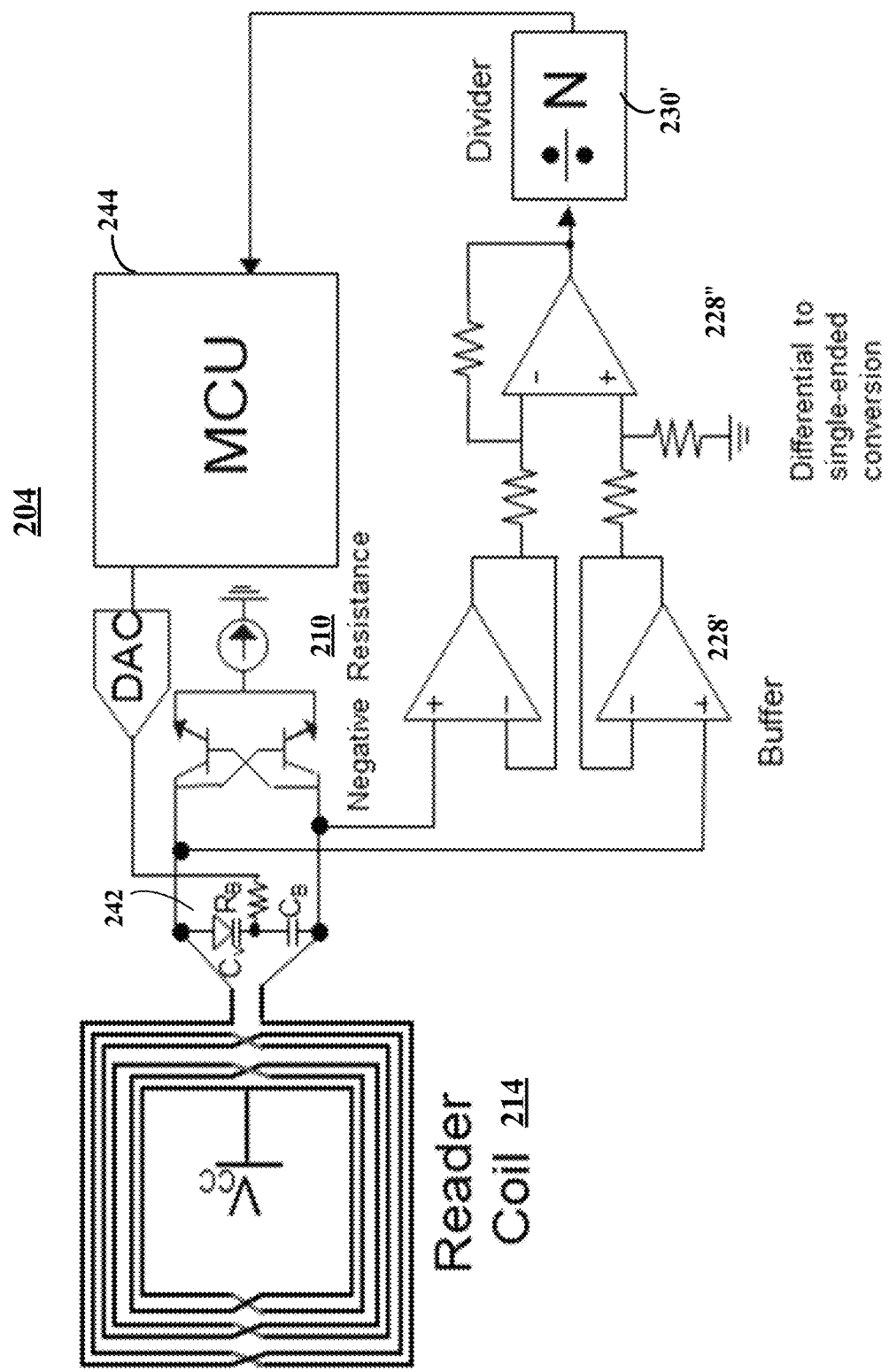

FIGS. 2A and 2B show examples of specific readers 202 and 204, consistent with embodiments of the present disclosure, with reader 204 of FIG. 2B having a resonance circuit including a negative resistance circuit 210, forming the crux of an oscillator core. Each reader 202 or 204 thereby has an oscillator core coupled to a coil 212 or 214, which acts as the inductance of the oscillator core and couples to the sensor circuitry to obtain data, such as a sensor-obtained measurement. The sensor circuitry is exemplified as including one or more passive sensors $216_1$ through $216_n$.

The negative resistance core 210 form the frequency-signal generation circuit 220 for providing a frequency-varying signal which may be swept (or generated at different frequencies or frequency segments) over a range to effect and detect resonance between the inductively-coupled resonance circuits of the reader and sensor, for example, via near-field communication. The frequency-signal generation circuit 220 may be controlled by digital/discrete logic circuitry 224 for controlling the signal generation via a varactor circuit 226. Signals from the terminals of the coil 212 may be monitored and differentially amplified via amplification circuitry 228 (228' and 228" in FIG. 2B) processed for presentation to the circuitry 224 and, if appropriate for signal sampling used by circuit 224, via a divide-by circuit 230 (or 230' in FIG. 2B). Once detected (e.g., at the circuitry 224), the circuitry 224 may then use the resonance frequency to detect the presence of the sensor being associated with a resonance frequency corresponding to the sensed condition and, in other examples, also to control the inductively-couple signal at such frequency for data transmissions involving one or more of the sensor(s) $216_1 \ldots 216_n$.

Note: The reader first performs a sweep to obtain a baseline measurement without the sensors $216_1$-$216_n$. To this end, the MCU 244 provides a ramp signal to the varactor 242 and the resonance frequency of the reader alone (uncoupled) is measured through 228, 230 by 244. This data is stored in 244. Then, the sensor(s) $216_1$-$216_n$ can be measured by placing them in the measurement distance of the reader. To perform the measurement, a similar frequency sweep is performed and the self-oscillating frequency (of the coupled system between the reader the sensors) is measured by 244. Then, MCU 244 compares the measurements and when a jump is detected, that is the frequency where w(reader)=w (sensor).

The reader of FIG. 2B illustrates a variable-capacitance circuit 242 being controlled (or tuned) via a cooperatively-coupled microcontroller (or MCU) 244 programmed/configured to generate a ramp signal which is applied to a varactor circuitry 242 by a digital-analog converter. In response to this ramp, the capacitance of the varactor 242 changes, causing a frequency (via an induction or magnetic field) which sweeps across a frequency range for prompting resonance via the resonance circuit of the reader and the resonance circuit(s) of the sensor(s). As an alternative to using a varactor, digitally programmable capacitor array can be used which can be directly programmed via MCU 244 using digital signals without the need for a digital-analog converter. Additionally, a potentiometer can be used instead of a digital-analog converter to manually control the sweep rate.

In related examples, such a reader apparatus may include a battery as a power source for handheld applications. Instead of or in addition to using a battery on the reader, the required power can be harvested from an external source (e.g., from NFC transmitter of a cellphone) in which case a power management unit (PMU) circuit 250 will be configured and used to provide the required stable supply voltage for the operation. The reader apparatus is not limited to the above described components, and as illustrated, can include a transmitter circuit 252 and antenna 254 such that the reader apparatus can output and/or wirelessly transmit data obtained or derived from the sensor circuitry to other external circuitry. In some example embodiments, the reader and/or the sensor(s) may further include a data-receiver circuit (in some wireless-communications embodiments, with an antenna) to receive communications from other external circuitry.

As previously described, for a system of two coupled RLC circuits, depending on the coupling strength, there can be two or three eigenvalues, giving rise to either two or three possible modes, respectively. This means that there are two or three resonance frequencies, in which the imaginary part of the input impedance falls to zero. Since an equal amount of gain and loss is present in such a system, the two coupled resonance circuits form an oscillator which can oscillate in either of the above-mentioned real modes, e.g., resonance frequencies. Each mode has a certain amount of gain, which is provided by the negative resistance such that the oscillations of the corresponding mode builds up and continues. If the system is fully parity time (PT) symmetric, e.g., the two resonance circuits have equal resonance frequencies, as may occur when fully tuned and the loss presented to the system is balanced with an equal amount of gain, the required gain for each mode is equal. This means, the system can begin to oscillate in any of the two resonance frequencies, almost equi-probably. However, if the system is off-tuned, e.g., if the resonance frequencies of the two sides are different, then each one of the three modes have a different required gain. Due to the non-linear behavior of the gain mechanism, the mode with the lowest required gain builds-up and other modes decay.

As described above, the resonance frequency of the sensor side is denoted by $\omega_2$ and that of the reader side by $\omega_1$. Also, two of the resulting modes are denoted by $\omega+$ and $\omega-$ which correspond to the modes with the highest and lowest frequency, respectively and are referred to as the self-oscillating modes. The third mode is the anti-resonance mode which corresponds to a minimum in the amplitude of oscillations and which does not emerge. It can be shown that if $\omega_1$ is greater than $\omega_2$, then the required gain of $\omega+$ is lower than that of $\omega-$ and $\omega+$ builds up. If $\omega_1$ is smaller than $\omega_2$, then the required gain of $\omega-$ is lower than that of $\omega+$ and $\omega-$ builds up. Therefore, the self-oscillating frequency can serve as an indication of how $\omega_1$ and $\omega_2$ compare to each other. This can be used in many sensor readout applications, where a measurement of the resonance frequency of the sensor, $\omega_2$, is used.

In such embodiments as described above, the reader apparatus includes the oscillator core along with a coil, which acts as the inductance of the oscillator core and couples to the sensor to perform the measurement. During a calibration phase or mode, the reader apparatus sweeps its frequency, $\omega_1$, and creates a look-up table of its free-running frequency. In the measurement phase, the oscillator again sweeps its frequency but now measures the self-oscillating frequency $\omega(self)$. The frequency at which $\omega(self)$ becomes larger than $\omega_1$, is when $\omega_1 = \omega_2$.

The reader apparatus can further include components to sweep the frequency (e.g., sweep the resonance frequency or a frequency of an inductively-coupled oscillating signal via varactors or other circuit components) over a range of frequencies and digital circuitry can be used to measure the self-oscillating frequency (as further described herein) and to detect the jump in measured frequency (in some instances, also with a simultaneous or concurrent detection of jump in the amplitude of a power-related parameter (i.e., voltage and/or current)). In specific embodiments, the digital circuitry includes sensing circuitry configured to detect the jump (or sudden transition) and, in response, this indicates appropriate timing (e.g., via this jump-related parameter and/or a set of inductively-related parameters) for data to be obtained from the sensor circuitry. Example timing and/or inductively-related parameters include, among others, a resonance frequency of the reader for obtaining the data (e.g., $\omega_1$).

Figure 2C:
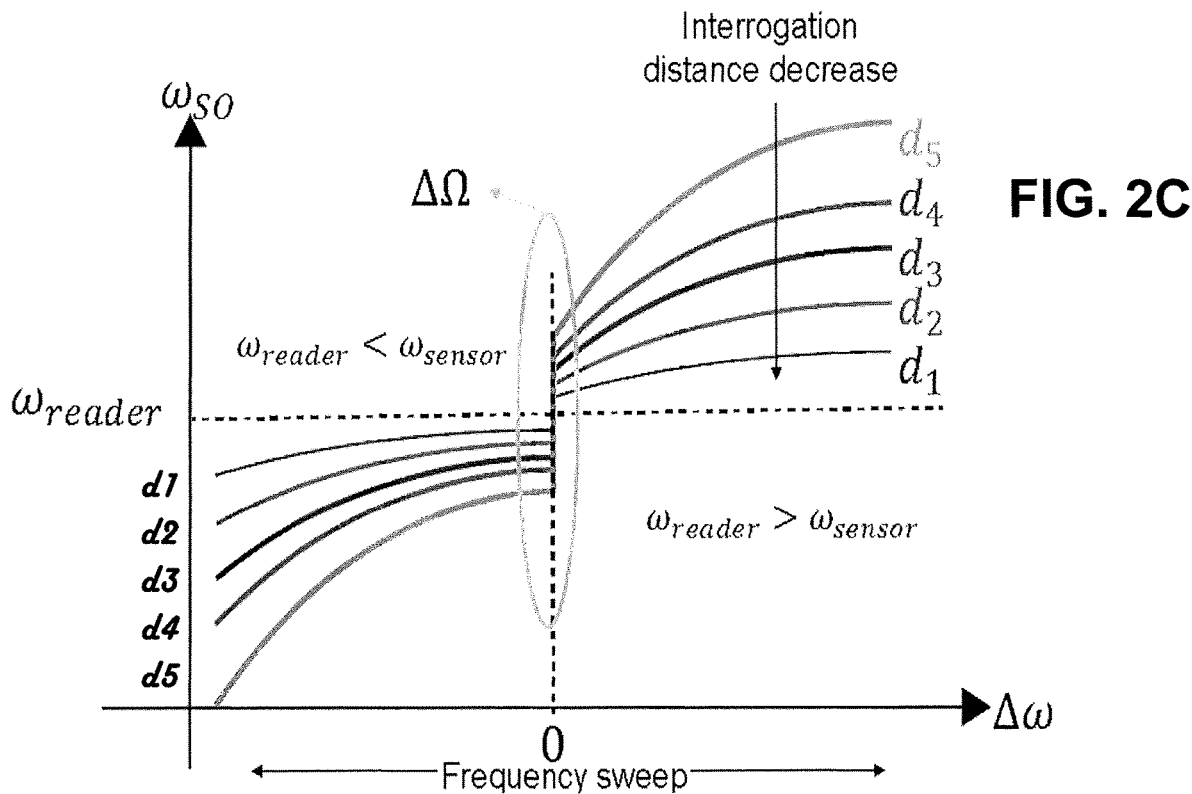

As in FIG. 2C, an example of such a jump, in response to sweeping the frequency, may be detected such that $\omega_1 > \omega$ (self) before the jump and $\omega_1 < \omega(self)$ after the jump. For example, the digital circuitry can include a processing circuit configured and arranged to measure and detect the jump (and optionally create the lookup table), and a memory circuit to store the measurements, both the frequency and the resulting data obtained from the passive sensor circuitry. The frequency associated with the jump can be used by the reader apparatus to obtain data, such as sensor-obtained measurements from the passive sensor circuitry, for example, after detecting or concurrently with detection of the sweep. As shown, the jump in response to sweeping the frequency may be detected independent of the distance (d1, d2, d3, d4 or d5) between the reader and the sensor.

Alternatively, in various embodiments to save measurement time, the oscillator can forgo the calibration phase and directly sweep the frequency while sensor data is being taken. In such embodiments, when a jump in the self-oscillating frequency is detected the sweep stops and the sensor can be removed. At the frequency corresponding to when the jump occurs, the free-running frequency is equal to $\omega_2$. This behavior is independent of the coupling factor between the passive sensor circuitry and the reader apparatus. Regardless of the distance or orientation between the two, if $\omega_1$ is greater than (02, the self-oscillating mode is greater than $\omega_1$ (and $w_2$) and when $\omega_1$ is smaller $\omega_2$, it (e.g., the self-oscillating mode) is smaller than $\omega_2$ (and $\omega_1$). While the sensor circuitry, in the above described embodiments, is described as a parallel inductive-capacitive tank, in various embodiments, the passive sensor circuitry may have any other appropriate circuitry depending on the application, e.g., a cavity resonator or any other fully-passive sensor which relies on resonance.

Figure 2D:
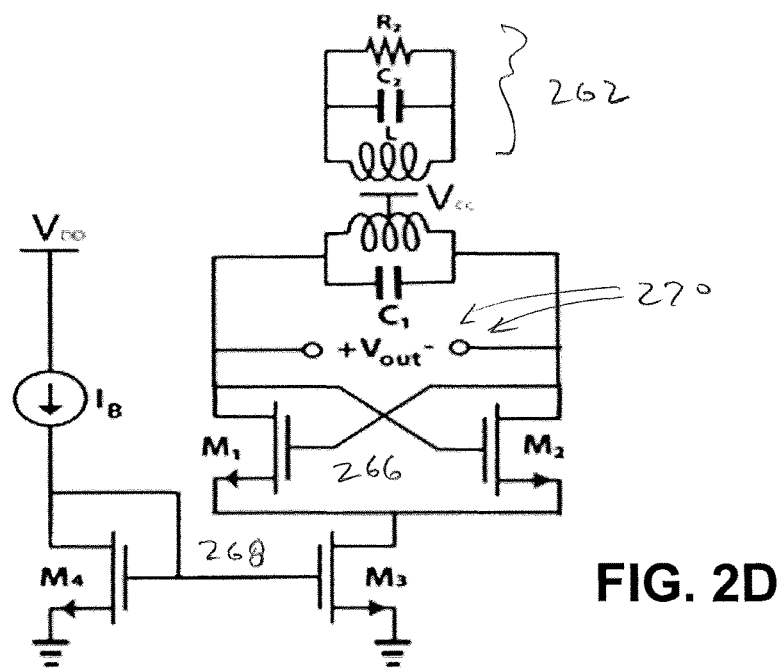

Also consistent with embodiments of the present disclosure, FIG. 2D shows a FET-based negative resistance circuit 264, as an alternative to the example bipolar-transistor circuitry used to implement the negative resistance circuit 210 of FIG. 2B. In this example of FIG. 2D, current derived from an inductively-coupled sensor 262 is drawn through cross-coupled NMOS-transistor circuit 266 via an NMOS-based current source/sink circuit 268 (via NMOS transistors which form a current mirror to bias the oscillator core). In response, a signal (differential or single rail) may be derived from the $V_{out}$ terminals 270, similar to the example bipolar-transistor circuitry.

Figure 3B:
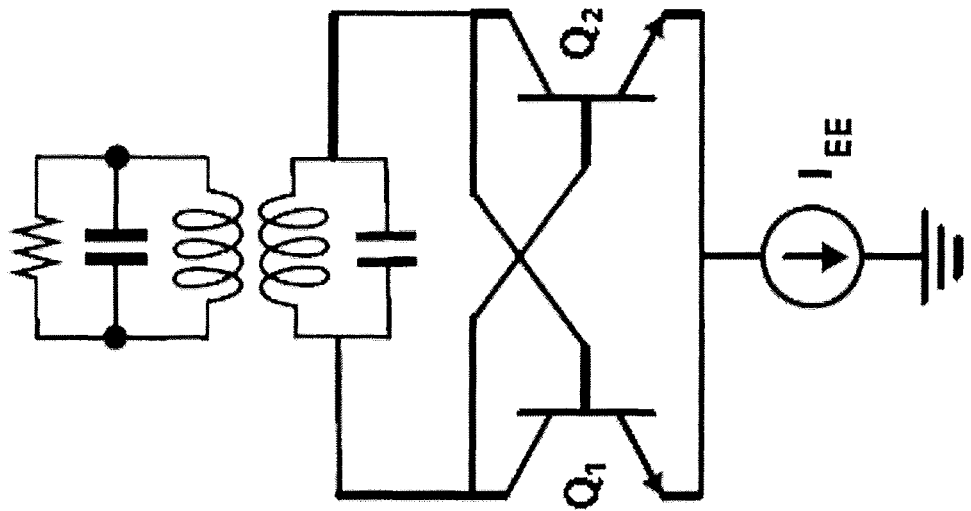
FIGS. 3A-3B show an example circuitry of a reader apparatus, consistent with embodiments of the present disclosure.
Figure 3A:
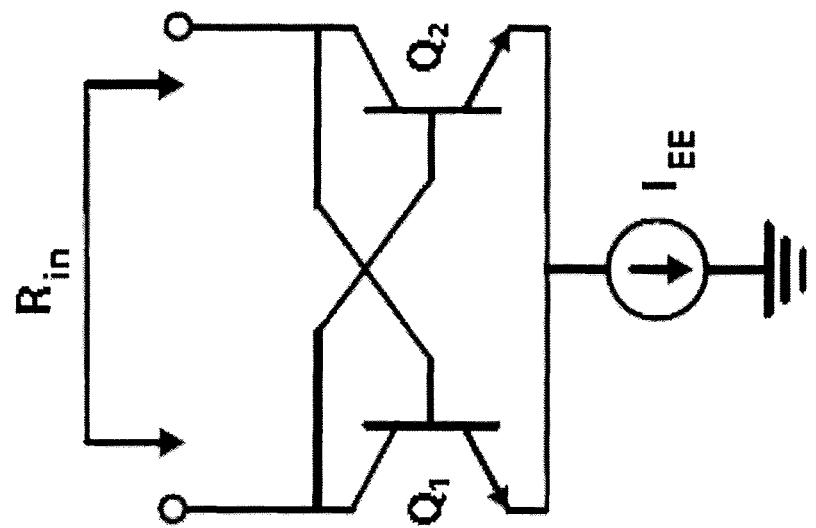

FIGS. 3A-3B show exemplary circuitry which may be used in a reader apparatus, consistent with embodiments of the present disclosure. As described above, the reader apparatus may include a resonance circuit that exhibits gain. The gain (with a rate $\gamma_1$) can be implemented by an external source (e.g., adjusted manually) or using a non-linear compressive gain which depends on the amplitude of oscillation. A relatively simple topology of transistors can yield such a nonlinear gain factor through a negative input resistance it presents to any two-port network connected to it, which herein are referred to generally as negative resistance circuitry. For example, using the circuitry depicted in connection with FIGS. 2B and 3A-3B, a pair of cross-coupled bipolar junction transistors (e.g., ROHM 2SC3838) may be implemented to present a negative resistance to the load connected to their collectors.

It is noted that for the system to remain stable (e.g., to achieve sustainable oscillations), the gain mechanism can automatically set its value such that it fully cancels the loss presented to it. An example negative resistance circuitry used to provide the gain is illustrated by FIG. 3A. As shown, the example negative resistance circuitry includes two transistors that are cross-coupled to present the negative input resistance, $R_{in}$. If the two transistors are identical, it can be shown that the small-signal input resistance is given by $R_{in}=-2/g_m$, where $g_m=I_{EE}/2nV_T$ is the transconductance of the bipolar transistor. Such embodiments of negative resistance are independent of the operating frequency of the first order. If the apparatus parasitics are small compared to the capacitance of the reader apparatus and the sensor circuitry, then the capacitive part of the input impedance is negligible. If used as shown in the schematic of FIG. 3B, the cross-coupled pair of transistors forms an oscillator along with the impedance presented to it from the resonance circuit (e.g., the RLC circuit or the tank circuit along with the sensor coupled to it magnetically). As further illustrated below in connection with the experimental embodiments, three modes and three required gain values are calculated corresponding to each. The gain is synonymous to the amount of loss which is presented from reader apparatus and the sensor circuitry and the negative resistance, which is denoted by $\gamma_{2,eff}$. The amplitude of reader apparatus can be expressed in the time domain as illustrated below by equation (12). The negative resistance circuitry can be used to saturate the gain mechanism as further described below.

Figure 4B:
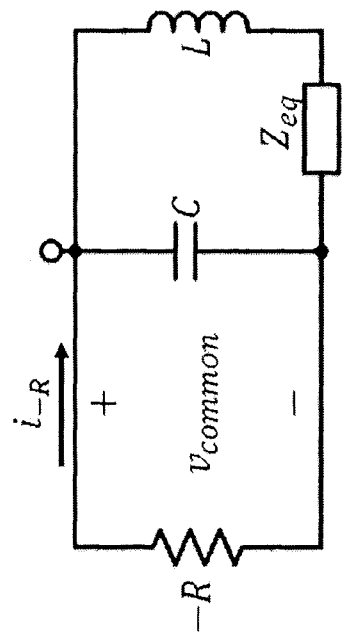
FIGS. 4A-4D show an example negative resistance circuitry of reader apparatuses, consistent with embodiments of the present disclosure.
Figure 4D:
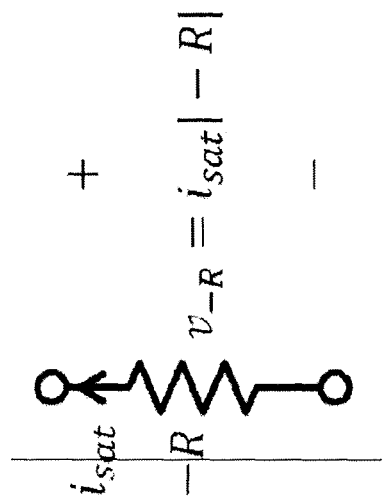
Figure 4A:
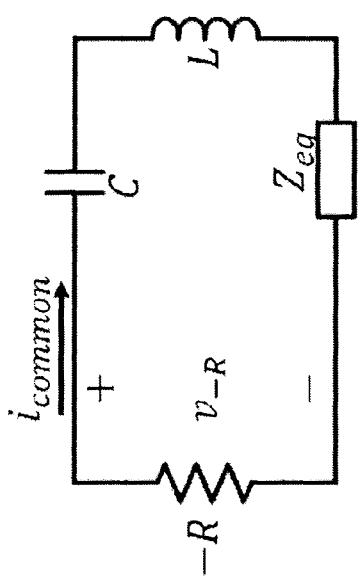
Figure 4C:
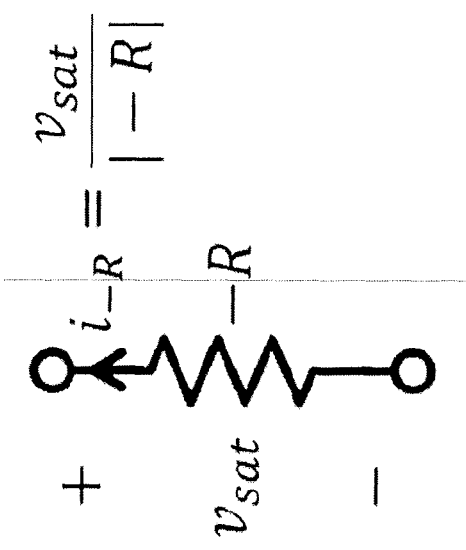

FIGS. 4A-4D show an example negative resistance circuitry of reader apparatuses, consistent with embodiments of the present disclosure. In various embodiments, the reader apparatus can include a resonance circuit that is in series with the negative resistance circuitry or in parallel with negative resistance circuitry. FIG. 4A illustrates an example of a resonance circuit in series with the negative resistance circuitry and FIG. 4C illustrates the respective final equivalent voltage and current-saturated models. FIG. 4B illustrates an example a resonance circuit in parallel with the negative resistance circuitry and FIG. 4D illustrates the final equivalent voltage and current-saturated models.

EXPERIMENTAL/MORE DETAILED EMBODIMENTS

Various more-detailed/experimental example embodiments are directed to reader apparatuses and remote sensing systems having passive sensor circuits cooperatively configured with a reader apparatus that interrogates the passive sensor circuits in a coupling-independent manner. The coupling-independent manner can be provided by coupled RLC circuits that have frequency-imbalanced PT-asymmetry. In various experimental embodiments, the frequency-imbalanced PT-asymmetry is taken advantage of by deriving the Hamiltonian and equivalent eigensystem for a general PT-asymmetric dimer with off-tuned resonance circuits and investigating the behavior of the resulting complex eigenfrequencies. As described above, the nonlinear saturation mechanism of the negative resistance from the theoretical coupled-modes and practical circuits perspectives are observed, providing an ideal equivalent circuit model depending on the employed saturation mechanism. Such techniques are applied to sensor telemetry with concrete measurement results.

Figure 5A:
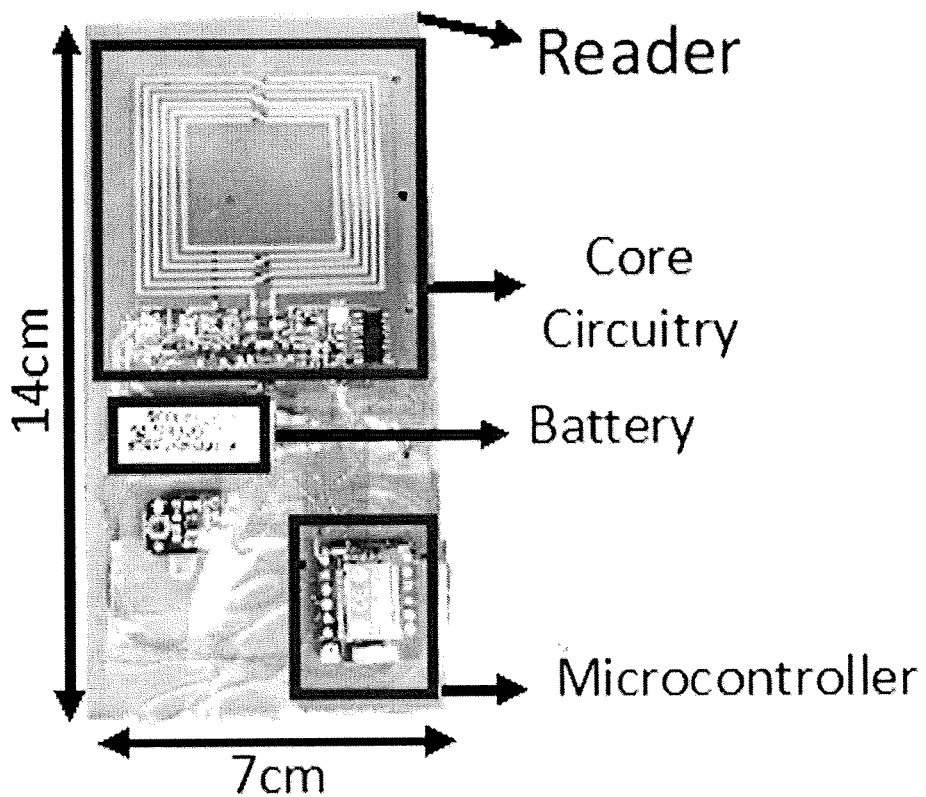

Consistent with an experimental embodiment of the present disclosure, FIG. 5A shows one such specific example reader implemented using commercially-available parts. The reader circuitry consumes an area of 6 cm×7 cm (or less) and this includes the core oscillator for inductively coupling with one or more sensors, amplification and buffer circuitry (e.g., via microchip MIC920) to prevent loading of the oscillator core and perform differential to single-ended conversion of the output signal, varactor circuitry (e.g., Infenion BBY66 as a varactor and TI DAC101S101 as a digital-analog converter), and as may be useful, bias circuitry for the core oscillator. As certain example embodiments may be implemented using the reader circuitry with or as part of a wireless-communication handheld unit, these overall dimensions (as depicted) may be implemented within a six-inch smart phone for a potential reader sticker application in which the reader is implemented as a sticker applied to the back of a smart phone.

In connection with readers such as in illustrated for the above embodiments, order to measure the steady-state modes in the sensing mechanism, such a reader as in FIG. 5 (based on off-the-shelf components) may be configured to sweep the resonance frequency of its oscillator core. In one experimental embodiment, the frequency range of operation may be set to an NFC band (near-field communication band, e.g., around 13.56 MHz, or depending on the implementation 13.56 MHz±5%). The frequency may ultimately be measured on a micro-controller unit (e.g., MCU/RedBear BLE nano V2) with a maximum sampling rate of 1 MHz, with frequency division circuitry (e.g., Nexperia 74HC4060) to lower the frequency to well within the sampling capability of the ADC (to frequency range of 2-3 kHz). In this example, the frequency of the core oscillator may be measured by counting the number of clock cycles (period of 1.62 μs) of the micro-controller unit in each period of the input signal (e.g., averaged 16 times to improve signal-to-noise ratio (SNR)). Using a supply voltage for the oscillator core (e.g., $V_{CC}$ at 0.9 V) being provided through a low-dropout regulator more flexibility is offered in terms of voltage and duty-cycling for power management. In connection with certain experiments, the reader circuit of FIG. 5 consumes 30 mW from a 3.7V battery (Powerstream GMB451230R).

In another embodiment including a reader and a set of sensors, the set of sensors include a first sensor having a first resonance circuit and to monitor a targeted environment or condition, and include a second sensor having a second resonance circuit and to monitor another targeted environment or condition. Each of the first and second sensors has a different resonance circuit configured and arranged to exhibit loss and to resonate uniquely for identifying or distinguishing the sensor. Inductive-coupling circuitry associated with the first and second resonance circuits causes an inductively-coupled oscillating signal to be swept over a range of frequencies and, in response, creates a change in a signal parameter coupling between the first resonance circuit and the second resonance circuit while the first and second resonance circuits are inductively-coupled. In effect, this permits for the multiple sensors to monitor targeted environment(s) or condition(s) as discussed herein (e.g., bio-sensing, health and food monitoring), each of the first and second sensors has a different resonance circuit configured and arranged to exhibit loss and to resonate uniquely for identifying or distinguishing the sensor and to permit a common reader to operate with the sensors simultaneously/concurrently.

In another example related to the implementation of FIG. 5, a reader circuit is fabricated on or in a flexible PCB (printed circuit board) thickness of 100 μm and the core circuitry occupies 6.5 cm×5 cm, mainly dominated by the reader coil. Such a reader coil may be implemented on the PCB with copper traces, with the fabricated inductor characterized with: L=2.3 μH and Q=60-70 at the frequency range of interest. Apart from the coil terminal leads, such a reader coil may be sized along a plane of the PCB within a square area of 4.7 cm by 4.4 cm.

In one example using the above-described implementation, the frequency sweep range is from 10 to 13.6 MHz in 416 frequency steps of 8.65 kHz. This frequency range is chosen based on the expected resonance frequency range of the sensors. Each step is measured to take 5.3 ms (millisecond), with an added hold time of 1 ms to ensure that the oscillator reaches steady state after each frequency step. In this regard, each full measurement (or frequency sweep) may span approximately 3 seconds, and this measurement may be reduced by decreasing the number of steps and the hold time. The resolution of the frequency step may determine the resolution of the measured resonance frequency. Therefore, the frequency step, cannot be too coarse as this may affect the accuracy of the sensor measurement. Accordingly, this dynamic presents a trade-off between sweep time and measurement resolution.

In one related experimental example consistent with the above examples and the experimental implementation as in FIG. 5a, an LC tank may be built using off-the-shelf components and with a variable resonance frequency to model a programmable sensor using the same varactors as used in the reader. The reader prototype may be used to make measurements of the resonance frequency which is then translated to a capacitance value. The measurement is performed up to an example range of 3 cm. As the distance between the reader and the sensor changes, so does the coupling strength. The measurement therefore demonstrates the coupling independence of the measurement with a maximum error of 3.1% in the measured capacitance (translating to roughly 1.5% error in resonance frequency measurement).

Figure 5D:
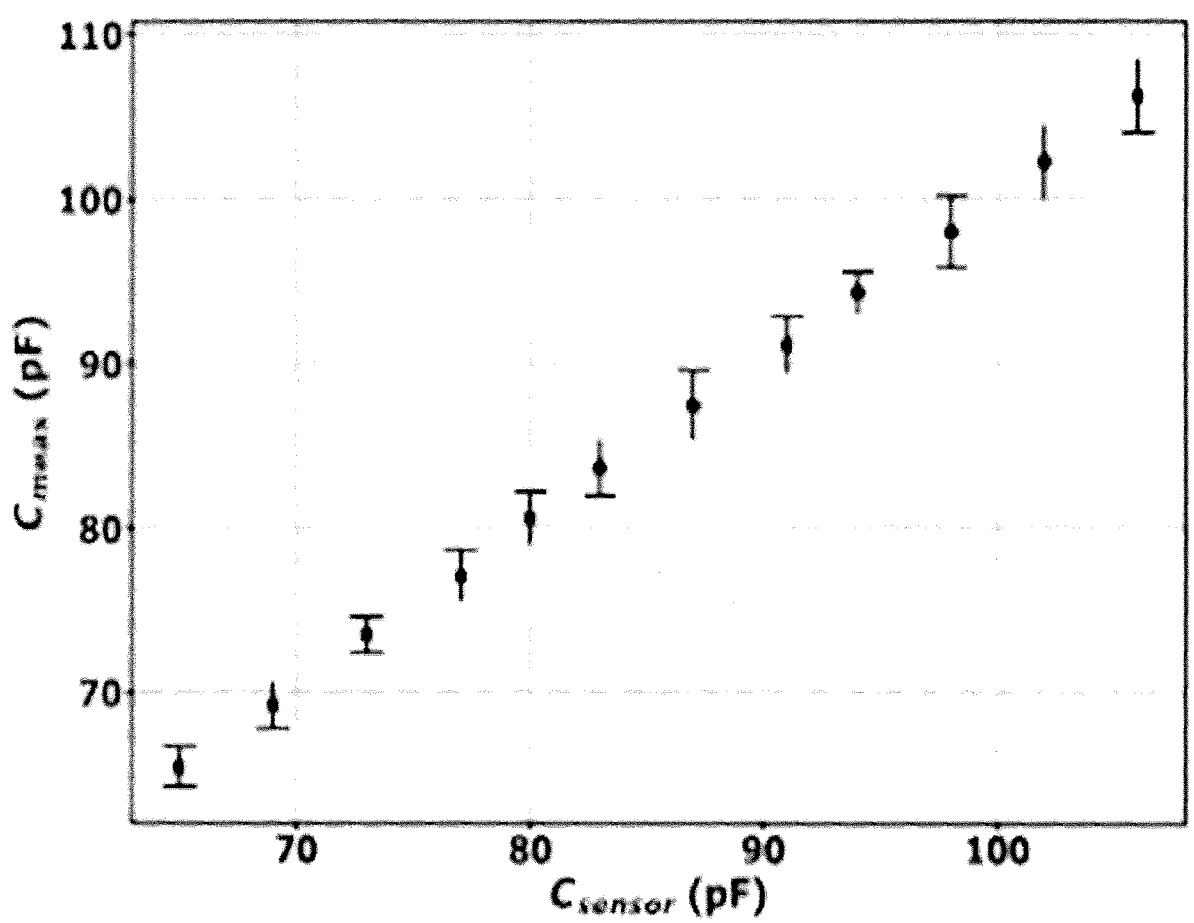

FIGS. 5B and 5C respectively show measurement performance with FIGS. 5B, 5C and 5D depicting the measured resonance frequency and the measured capacitance of the programmable sensor (calculated from the results in FIG. 5B using $$f = \frac{1}{2\pi\sqrt{LC}}),$$

whereas FIG. 5D illustrates an error bar plot for the measurement. Each vertical line corresponds to one setting of the programmable sensor while its distance to the reader is varied. The sensor capacitance is varied according to the values in Table 1 under actual values of the capacitance. The actual and measured values of the capacitance are listed below in Table 1 showing the mean and standard deviation of the measured capacitance as well as the maximum and minimum measured error percentage. Table 1 indicates that the worst-case variations in the measured capacitance across different readout distances is better than 3% for 95% of the measurements.

| Actual Value pF | $\mu_{meas.}$ pF | $\sigma_{meas.}$ pF | Max Error % | Min Error % |
|---|---|---|---|---|
| 106 | 106.1 | 1.47 | 2.5 | 0.1 |
| 102 | 102.0 | 1.64 | 3.1 | 0.3 |
| 98 | 97.8 | 1.3 | 2.6 | 0.1 |
| 94 | 94.0 | 1.40 | 3.1 | 0.4 |
| 91 | 90.9 | 1.225 | 2.7 | 0.0 |
| 87 | 87.3 | 1.416 | 3.0 | 0.0 |
| 83 | 83.2 | 1.56 | 3.1 | 0.2 |
| 80 | 80.5 | 1.27 | 2.5 | 0.5 |
| 77 | 77.0 | 1.04 | 2.6 | 0.4 |
| 73 | 73.3 | 0.979 | 2.7 | 0.3 |
| 69 | 69.2 | 0.73 | 2.2 | 0.2 |
| 65 | 65.3 | 0.918 | 2.4 | 0.3 |

In other examples consistent with the instant disclosure, embodiments are directed to use of a system in which a reader is cooperatively arranged with a group of sensors (as exemplified in FIG. 2A), each having biosensing sensing circuits, each having one or more electrodes, for measuring different biological parameters, such as pressure, temperature, sweat, heart rate, etc. The sensors may be worn by the patient/user on the skin or as an implant as discussed above. Since the sensor may only consist of an inductor coil and a sensing element (in this case, capacitance), the manufacturing cost of the sensor is minimized or heavily reduced. If the sensors are placed apart by more than the readout range of the reader coil, all sensors can have the same the same resonance frequency and no interference occurs. The user can place the reader on top of each individual sensor (up to the maximum distance) and perform the readout for individual sensors.

In certain specific embodiments, one or more sensors may be located in the operating range of the reader and with the reader performing simultaneous measurement via the sensors. In this case, the interference between the sensors can be avoided by selecting a different resonance frequency for each individual sensor and ensuring that the frequency range due to sensing does not overlap with other sensors (e.g., the user may place the reader in front of a cluster of sensors). In this instance, the reader may be configured to perform a wideband frequency sweep covering the frequency range of all individual sensors.

When multiple sensors are present in the detection range of the reader, multiple break points can be observed. The two resonance frequencies can be measured without any interference. The measurement can be performed regardless of the distance between the reader and the sensor, provided that the measurement is done within the coverage distance of the reader. For example, sweeping across a range of 2.0 MHz to 2.5 MHz, a single sensor may effect a resonance frequency at 2.7 MHz, whereas for two sensors in the detection range, the respective sensor resonance frequencies may be 2.1 MHz and 3.2 MHz (with Qs=14, k=0.2 (d=1 cm) for both sensors). The different resonance frequencies may be found by detecting the single changes in the difference of the reader resonance frequency with and without sensors.

In another experimental example, a reader is used to generate a frequency sweep (e.g., 1.5 MHz to 8.5 MHz) with and without any sensor to assess detection ranges for three sensors used at the same time. The different resonance frequencies for the respective sensor were measured via distinct frequency jumps at 1.8 MHz (sensor 1), 2.7 MHz (sensor 2), and 5.3 MHz (sensor 3), with Qs=14, k=0.2 (d=1 cm) for each sensor. The readily-detectable jumps in frequencies shows that these three sensors may be read out simultaneously, provided that all three are within the reading distance of the reader, without cross-interference.

The same measurement approaches may be applied in connection with embodiments directed to use of a system in which a reader is cooperatively arranged with a group of sensors secured to a bed or other apparel-like product for biosensing rest/sleep-monitoring applications. This may also be illustrated with reference to sensors shown in FIG. 2A with each such sensor attached to or embedded in a mattress (not shown), and with the multiple sensors being wearable and configured to measure one or more physiological parameters including, as examples, heart rate, blood pressure, pulse, movement, sleep quality, etc. Assuming an example with only two sensors, the reader simultaneously interrogates the two sensors with different resonance frequencies, $f_{s1}$ and $f_{s2}$. As discussed above, such a reader in this system is configured to interrogate more than one sensor simultaneously if all sensors are within the readout range of the sensor. This, in addition to the range-independence of the measurements, make this reader/sensor solution suitable for sleep monitoring. In this scenario, the user can wear multiple sensors embedded in a sleepwear or directly on the body. The reader coil and circuitry will be embedded in the mattress (or the bedframe) and can perform measurement of all the sensor even when the user moves or rolls over in the bed (independent of distance within the operating range of the reader). The sensors can collect several information from the user, namely vitals, sleep quality, movement, etc. The reader can communicate this data to an app on a smart phone.

Food safety: In this application the reader can be embedded as a thin sticker which can be applied onto a smart phone in a grocery store. The sensors will be embedded in the food package or container and can measure different parameters, such as ripeness, freshness, etc. For example, the sensor can detect chemical changes in a food package and provide the user with warning signs of food spoilage. In another example, the sensor can detect temperature changes in frozen or refrigerated goods and record whether the temperature has exceeded a predetermined threshold in an irreversible manner. Similar to previous applications, multiple sensors can be interrogated using one reader provided that they are all placed in the operating distance of the reader.

For an appreciation of the reader's operating distance, further experiments/simulations reveal that for a quality factor of Q=10, 20, 30, 50, a maximum distance of 3 cm, 4.2 cm, 5.2 cm, and 6.5 cm can be achieved when both coils are identical with dimensions of 4.2 cm×4.7 cm. When the reader coil is 4.2 cm×4.7 cm and the sensor is 2.2 cm×2.2 cm, quality factor of Q=10, 20, 30, 50, a maximum distance of 2 cm, 3 cm, 3.8 cm, 4.8 cm can be achieved. When both coils have small dimensions (2.2 cm×2.2 cm), then Q=10, 30, 70, a maximum distance of 1 cm, 1.5 cm, and 2.5 cm can be achieved. Such simulations may be performed with the reader and sensor coils having a planar arrangement with planar dimensions of 2.5 cm-7 cm along each of axis (e.g., the reader coil may be 4.7 cm by 4.4 cm, and the sensor coil may be 2.2 cm by 2.2 cm). In a first case, such planar dimensions are used with where the coils being identical. In a second case, each sensor coil is four times (or in a range of 3.5-4.5 times) smaller than the reader/transmitter coil, and in a third case two smaller coils are used. Simulation results for these three cases show that for the larger coils, a larger coupling strength is achievable when the sensors are close. The quality factor of the sensor is given by $$Q = \frac{R_s}{Z_0} = R_s\sqrt{\frac{C_s}{L_s}},$$

where $R_s$ is the parallel resistance of the sensor (either intrinsic due to loss, or explicit resistance), $C_s$ is the sensor capacitance, and $L_s$ is the sensor inductance. The simulation shows that for a quality factor of Q=10, 20, 30, 50 a maximum distance of 3 cm, 4.2 cm, 5.2 cm, and 6.5 cm can be achieved when both coils are identical with dimensions of 4.2 cm×4.7 cm (e.g., dimensions within range of 4 cm×5 cm). When the reader coil is 4.2 cm×4.7 cm and the sensor is 2.2 cm×2.2 cm, quality factor of Q=10, 20, 30, 50, a maximum distance in a range from 2 cm to 5 cm (e.g., 2 cm, 3 cm, 3.8 cm, 4.8 cm for these respective quality factors) can be achieved. When both coils have smaller dimensions in a range of 1.5 cm×2.5 cm, a maximum distance of 1 cm, 1.5 cm, and 2.5 cm can be achieved (e.g., for coils at 2.2 cm×2.2 cm, and Q=10, 30, 70).

In other related examples, such systems involving a reader and multiple remote sensors (e.g., as in FIG. 2A) may be used in food safety environments. Such systems use a reader (as disclosed herein) cooperatively arranged with a group of sensors secured to food packaging (or in some instances embedded in the food for later removal). In one such system, the reader is embedded within or as a thin sticker which is to be applied onto a smart phone in a grocery store. The sensors are embedded in the food package or container and are configured to measure one or more different parameters, such as ripeness, freshness, etc. In related example, one or more of the sensors is configured to detect chemical changes in a food package and provide the user with warning signs of food spoilage. This may be achieved, for instance, with the sensor having a pH-sensing electrode to detect positive charges (due to high concentrations of positively-charged hydrogen ions) and having data sent to the reader for comparison with the reader configured as a pH meter using the voltage-related data (e.g., positive voltage (mV) signal) compared to conventional pH levels for certain foods and food types. Alternatively, the voltage corresponding to the pH level (or change in level) is applied to a varactor within the sensor which in turn changes the resonance frequency of the sensor, and this change is detected in connection with the frequency sweep (e.g., by the reader). The comparison (to the received data or to the food-specific resonance frequency) may then be done in a table stored in a memory circuit of the reader/smart phone and accessed in response to each sensor. Since acidic foods contain increasingly higher concentrations of positively-charged hydrogen ions, the pH-sensing electrodes are used to detect the positive charges and the send may then send the data, indicative of the positive voltage signal to the reader. For example, 0 mV may be used to indicate a neutral solution (pH 7.0), whereas other data may indicate pH values which are more acidic or more alkaline levels solutions. The reader device (e.g., operating in conjunction with a smart phone) may also receive data in connection with such pH measurements to provide data on, or to categorize the type of, the particular food. As examples in this regard, the data regarding the particular food or food type as may be generated by: another NFC device which is activated by the reader and which is located in a section storing the food in a refrigerator, by a bar code scanned by reader, and/or by a Bluetooth/WiFi transmission synchronized to the reader/smartphone once the user (or food buyer) enters the store.

In another example, a system includes a reader and a set of sensors, with the set of sensors including a first sensor having the first resonance circuit and to monitor a targeted environment or condition, and including a second sensor having a second resonance circuit and to monitor another targeted environment or condition. Each of the first and second sensors has a different resonance circuit configured and arranged to exhibit loss and to resonate uniquely for identifying or distinguishing the sensor. Via the first and second resonance circuits, circuitry (e.g., in the reader) causes an inductively-coupled oscillating signal to be swept over a range of frequencies and, in response, creates a change in a signal parameter coupling between the first resonance circuit and the second resonance circuit while the first and second resonance circuits are inductively-coupled. For each such sensor, this change is associated with the resonance frequency designed for the sensor and the reader uses this, via the inductive-coupling circuitry, to convey data between the first and second resonance circuits such as by indicating a sensed condition associated with conditions expected/desired such as temperatures for the foods being monitored and, in connection with biosensing (normal versus abnormal versus no) cardiac pulse conditions. As previously discussed, the reader may include a memory circuit with a table which stores the data associated with the sensors and their respective sets of expected/desired conditions, and the tabled data is then accessed by an MPU or logic circuitry (e.g., in the reader) in a comparison step for indicating if the sensed condition is indicative of action to be taken according the configuration or programming of the reader (e.g., via the MPU or logic circuitry). It would also be appreciated that this methodology may be implemented in software, as stored in a tangible product (e.g., memory plug, disc, or other magnetic/electrically/chemically configured data storage device), and with the software being downloadable for use and execution via the MPU or logic circuitry of the reader.

In yet another example, each such sensor includes a pH sensing electrode which is configured using Ag/AgCl and Carbon paste, which generates a voltage in response to sensing pH changes. A voltage corresponding to the pH level (or change in level) is applied to a varactor within the sensor can changes the resonance frequency of the sensor, which is then detected in connection with the frequency sweep (e.g., by the reader). Alternatively, a voltage corresponding to the pH level (or change in level) is reported as data to the reader as discussed above. In another example, one or more of the sensors is configured with an electrode that detects temperature, or detects temperature changes in frozen or refrigerated goods and records whether the temperature has exceeded a predetermined threshold in an irreversible manner. Similar to the previously-discussed applications, the reader/smartphone multiple can be provided data about the food or food type (to be associated with the temperatures) and the sensors can be interrogated using one reader provided that they are all placed in the operating distance of the reader.

In another specific example, a system includes a plurality of sensors (e.g., $216_1$-$216_n$ of FIG. 2A) and a reader, and the system is configured to mitigate interference between the resonance frequencies by fabricating each of the sensors with different resonance frequencies. This can be implemented by, for example, fixing the sensor coil while choosing the sensor capacitance range in a way that each sensor will have a unique resonance frequency range across the measurement range of each sensor. In another more-specific embodiment, the same capacitive sensor may be used with the same range of variations in multiple sensors but different sensor coil (inductance) values such that each sensor will have a unique resonance frequency range across the measurement range of each sensor. This different resonance frequency range serves as a unique ID for each employed sensor. This information will be known in the outset by design and pre-programming of the sensor and may be stored in an optional lookup table or memory in or associated with the circuitry of the reader (e.g., the information in the table below). The reader in such scenarios sweeps the frequency for causing the resonance frequency associated with all the sensors and for detecting the associated multiple jumps due to the presence of the multiple sensors. Since the resonance frequency range(s) associated with each sensor is unique, the reader can map to each detected frequency jump and identify (uniquely and with distinction) the sensor corresponding to each frequency jump.

In such example embodiments, different sensors are designed to measure different parameters of interest, for example in food safety application temperature, pH, ripeness, etc. and so long as the range of variations of the resonance frequencies are non-overlapping, they can all be simultaneously identified and detected by one reader by way of frequency sweep and jump detection. In sleep monitoring, movement, pulse rate, sweat, etc. can be detected using three different sensors simultaneously so long as the range of variations of the resonance frequencies are non-overlapping. This allows for simultaneous detection of multiple sensor-related measurement of different kind. As shown in the table below, the reader may operate to cover the whole span of the perceived resonance frequencies of the sensor and the sensors employ RLC circuitry to exhibit non-overlapping resonance frequency in their individual sensing span.

|  | Frequency range | Baseline value |
| --- | --- | --- |
| Reader sweep range | $f_0$-$f_n$ |  |
| Sensor 1 | $f_0$-$f_1$ | $f_{b1}$ |
| Sensor 2 | $f_1$-$f_2$ | $f_{b2}$ |
| Sensor n | $f_{n-1}$-$f_n$ | $f_{bn}$ |

For each sensor ($216_1$-$216_n$), the baseline resonance frequency (absent the measurable medium, for example no pressure on a pressure sensor or room temperature for a temperature sensor) is designed for and characterized prior to sensor deployment. This information along with the frequency variation ranges is stored may be stored in an optional lookup table or memory on the reader. The reader compares the measured value through the sweep in the field and by comparing the measured resonance frequency with the unique baseline for each sensor, the relative measurement of the parameter can be done. The frequency difference between the baseline value and the field measurement, e.g. $\Delta f_1 = f_{self} - f_{b1}$ where $f_{self}$ is the self-oscillating frequency measured by the reader when coupled to sensor 1 as an example, can be translated to changes in the capacitance in sensor 1.

In another example embodiment, with a plurality of sensors with the same resonance frequency, after the resonance frequency is known by way of the sweep performed by the reader, maximum power can be transferred to the sensor (however, due to interference, sensor measurement would not be performed). Maximum energy transfer allows for wireless energy harvesting which enables more advanced sensor structures which may include, in addition to the RLC tank, other active circuitry, such as a controller or a memory element with pre-programmed ID numbers. Each memory element may include a unique pre-programmed digital code which would change the capacitance value of multiple sensors such that non-overlapping ranges for the resonance frequency is achieved. Then, sensor measurement of a plurality of sensors may be performed in a manner as already described in connection with other embodiments.

For further details regarding implementations of such sensors, reference may be made to US Patent documents. As examples, each of the following U.S. Patent documents is useful in disclosing different methods, materials, devices and structures which may be used for the RLC structures with type of capacitance-variance which may be used in connection with the resonant circuits of the above-described sensors (e.g., disclosing pressure sensitive structures useful for the above-disclosed capacitance/pressure-based biosensing examples): U.S. Pat. No. 10,545,058 (filed 7 Mar. 2016), U.S. Pat. No. 10,037,098 (filed 28 Jul. 2016), and U.S. Pat. No. 9,625,330 (filed 31 Jul. 2015), and also U.S. Patent Application Publication No. 2014/0350348A1.

Further Disclosure Involving Specific Embodiments, Uses and Applications

As may be appreciated in the context of implementations and applications involving or requiring a compact form-factor and/or a reasonable cost, a reader packaged as shown in FIG. 5 may be readily used in connection with food-safety monitoring, point-of-care health monitoring and handheld sensing applications, where size and cost is to be minimized. Further, such systems and applications may realize the above-related benefits via such PT-symmetric circuitries, and may further provide PT-symmetric mode-splitting for an enhanced quality factor without neglecting the use of the individual frequency modes that arise.

Using conservation of energy laws a closed system with real eigenfrequencies applied to Quantum Mechanical systems often results in Hermitian Hamiltonian formulations, and certain examples consistent with the instant disclosure operate corresponding to a subset of such a system by exhibiting entirely real energy spectra as long as their Hamiltonians are pseudo-Hermitic, or more specifically, jointly PT-symmetric (the system is jointly invariant to parity and time reversal). In accordance with these examples, this is achieved by counterbalancing energy loss mechanisms with energy gain mechanisms; allowing net energy conservation; in the case of PT-symmetric electronics, this takes the form of balanced positive and negative resistances. This PT-symmetry may be used with the examples of the instant disclosure to show that a dimmer (consisting of coupled RLC circuits) can realize a PT-symmetric circuit, provided that the gain (negative resistance) and loss (positive resistance) balance each other. In this context, mode-splitting and spontaneous symmetry breaking are experimentally demonstrable. Accordingly, certain example embodiments of the instant disclosure include telemetry sensing applications, using inductive coupling for sensor readout and achieving high-spectral resolution and sensitivity.

In connection with other experimental embodiments using the above-discussed aspects of a reader apparatus, exemplary modes for realized gains are illustrated below in Table 2 with modes and gains for $\Delta\omega=0$, as follows:

| Eigenfrequency | Required gain | Condition | Phase |
| --- | --- | --- | --- |
| $\omega_0 + \sqrt{\kappa^2 - \gamma_2^2}$ | $\gamma_1 = -\gamma_2$ | $a > 0$ ($\kappa > |\gamma_2|$) | Exact |
| $\omega_0 - \sqrt{\kappa^2 - \gamma_2^2}$ | | | |
| $\omega_0$ | $\gamma_1 = -\gamma_2 \kappa^2$ | $a < 0$ ($\kappa > |\gamma_2|$) | Broken |

In accordance with the above-experimental embodiments and other various embodiments, the Hamiltonian of two coupled resonance circuits, in which the two resonance circuits are frequency-imbalanced (PT-asymmetric) or $\omega_1 \omega_2$, can be considered. Note that equation (1) is only valid for weak coupling between the resonance circuits, e.g., when $\kappa \ll \omega_{1,2}$; choosing K on the order of $\omega_{1,2}$ results in inaccuracies due to non-orthogonal eigenmodes. The eigenfrequencies can be found by solving the characteristic equation, $\det(H-\omega I)=0$:

$$\omega^2 - \omega[(\omega_1+\omega_2)-i(\gamma_1+\gamma_2)] + (\omega_1-i\gamma_1)(\omega_2-i\gamma_2) - \kappa^2 = 0 \quad (4)$$

The equation (4) is a quadratic equations. Its roots (eigenfrequencies) can be written as:

$$\omega = \frac{\omega_1+\omega_2}{2} - i\frac{\gamma_1+\gamma_2}{2} \pm \sqrt{\left(\frac{\Delta\omega}{2}\right)^2 - \left(\frac{\Delta\gamma}{2}\right)^2 + \kappa^2 - i\left(\frac{\Delta\omega\Delta\gamma}{2}\right)} \quad (5)$$

where $\Delta\omega=\omega_1-\omega_2$ and $\Delta\gamma=\gamma_1-\gamma_2$. The general solution to this system has the form:

$$\begin{bmatrix} a_1 \\ a_2 \end{bmatrix} = \begin{bmatrix} a_{01} \\ a_{02} \end{bmatrix} e^{-iRe\{\omega\}t} e^{Im\{\omega\}t} \quad (6)$$

where $$\begin{bmatrix} a_{01} \\ a_{02} \end{bmatrix}$$

is the vector of complex initial conditions. And:

$$Re\{\omega\} = \begin{cases} \dfrac{\omega_1+\omega_2}{2} \pm \sqrt{\dfrac{\sqrt{\alpha^2+\beta^2}+\alpha}{2}}, & \beta \geq 0 \\ \dfrac{\omega_1+\omega_2}{2} \mp \sqrt{\dfrac{\sqrt{\alpha^2+\beta^2}+\alpha}{2}}, & \beta \leq 0 \end{cases} \quad (7a)$$

$$Im\{\omega\} = -\frac{\gamma_1+\gamma_2}{2} \pm \sqrt{\frac{\sqrt{\alpha^2+\beta^2}-\alpha}{2}} \quad (7b)$$

in which, $$\alpha = \left(\frac{\Delta\omega}{2}\right)^2 + \kappa^2 - \left(\frac{\Delta\gamma}{2}\right)^2 \quad (8a)$$

$$\beta = -\frac{\Delta\gamma\Delta\omega}{2}. \quad (8b)$$

The real part of the modes determines the eigenfrequencies and their imaginary part determines the time-evolution of their amplitude, equations (8b) and (7b) respectively. As further illustrated below, in the experimental embodiment section, due to the non-linearity of the gain, in steady-state, the gain balances the loss ($\gamma 1(|a1|)=-\gamma_2$), ensuring that $Im(\omega)=0$. In order to find the modes, equation (7b) can be set to equal to zero and the corresponding required gains can be identified, denoted by $\gamma 1$, arriving at the following two equations:

$$-\frac{\gamma_1+\gamma_2}{2}+\sqrt{\frac{\sqrt{\alpha^2+\beta^2}-\alpha}{2}}=0 \qquad (9a)$$

$$-\frac{\gamma_1+\gamma_2}{2}-\sqrt{\frac{\sqrt{\alpha^2+\beta^2}-\alpha}{2}}=0 \qquad (9b)$$

After revising, equations (9a) and (9b) can be represented as:

$$\gamma_1{}^3\gamma_2+\gamma_1{}^2(2\gamma_2{}^2+\kappa^2)+\gamma_1(\gamma_2{}^3+(\Delta\omega^2+2\kappa^2)\gamma_2)+\kappa^2\omega_2{}^2=0. \qquad (10)$$

As further illustrated below, the resulting equation (12), each root can be associated to either equation (9a) or (9b). Noting that the term with the square root is always positive, the root associated with equation (9a) can satisfy $\gamma 1 \geq |\gamma 2|$ while that associated with equation (9b) can satisfy $\gamma 1 \leq |\gamma 2|$. The roots can yield the required gain for each mode, can results in the frequency of each real modes.

Consider the case of tuned resonance circuits in which $\Delta\omega=0$, such as the resonance circuits previously illustrated by FIGS. 1A-1B. In this case, equation (12) can be written as $(\gamma_1+\gamma_2)^2(\gamma_1+\kappa^2/\gamma_2)$, suggesting two repeated roots at $\gamma 1=-\gamma 2$ and one root at $\gamma 1=-\kappa 2/\gamma 2$. Since $\beta=0$, then $\gamma 1=-\gamma 2$ satisfies both equations (9a) and (9b), resulting in modes in the form of $$Re\{\omega\}=\omega_0\pm\frac{|a|+a}{2},$$

where $\omega_1=\omega_2=\omega_0$. The root at $\gamma 1=-\kappa^2/\gamma_2$ makes $\alpha<0$, and the corresponding mode becomes $Re\{\omega\}=\omega_0$. These results are summarized in Table 3, which shows or suggests that the sign of $\alpha$ determines the bifurcation point. As shown in Table 3, this can also be expressed in terms $\kappa$ and $\gamma^2$ using equation (8a). The coupling at which mode bifurcation happens is represented as $\kappa_{critical}$ and for the PT-symmetric system, $\kappa_{critical}=|\gamma 2|$.

Figure 6A:
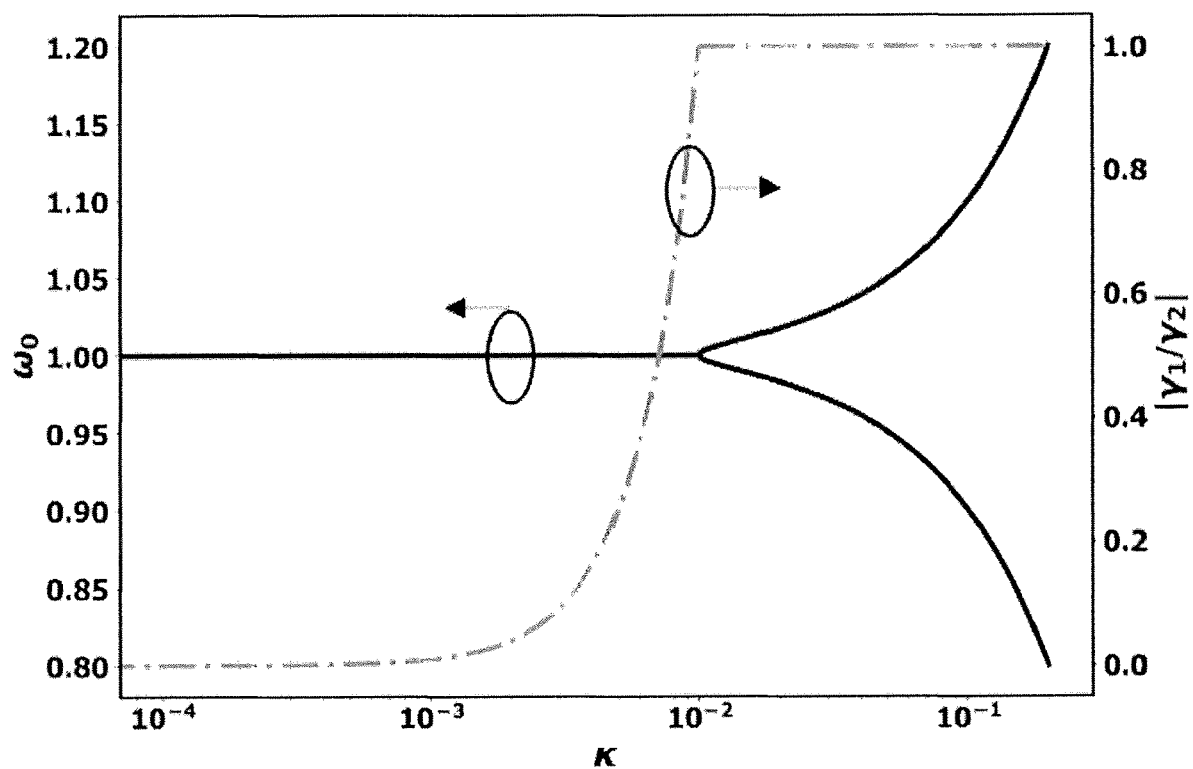
FIG. 6A shows an example of mode-splitting behavior and gain loss ratio of tuned resonance circuits versus variations of the coupling strength, consistent with various embodiments of the present disclosure.
Figure 6B:
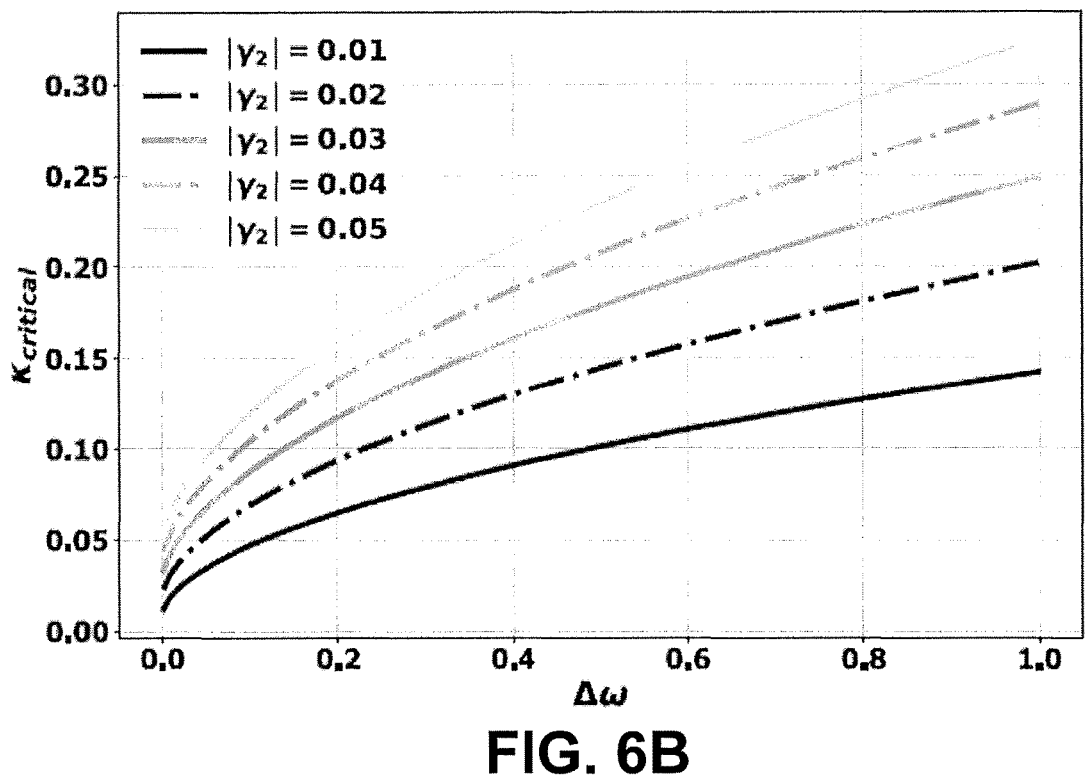
FIG. 6B shows an example of graph of $\kappa_{critical}$ verses $\Delta\omega$, consistent with various embodiments of the present disclosure.

FIG. 6B shows an example graph of $\kappa_{critical}$ verses $\Delta\omega$, consistent with various embodiments of the present disclosure. More specifically, the graph of FIG. 6B shows $\kappa_{critical}$ verses $\Delta\omega$ for different $\gamma_2$ and at $\Delta\omega=0$, $k_{critical}=|\gamma_2|$. As $\Delta\omega$ deviates from zero, stronger coupled can be used to create mode-splitting.

Equation (12) as further provided below, can be used to calculate the gains and their corresponding modes using equation (9b). Table 3 above summarizes the different scenarios.

As previously described equation (12) has three roots for different values of $\Delta\omega$, $\kappa$, and $\gamma 2$, however, in many embodiments, only the real roots are used. This is because the complex roots of equation (12) result in complex $\alpha$ and $\beta$, making $Re\{\omega\}$ complex as well.

With a given $\Delta\omega$ and $\gamma_2$, one can find $\kappa_{critical}$, before which equation (12) has two complex-conjugate roots and one real root, and after which it has three real roots. This coupling value determines the bifurcation point, since for $\kappa\leq\kappa_{critical}$ one real mode is possible, whereas for $\kappa>\kappa_{critical}$ there can be three possible modes. The discriminant, $\Delta$, of equation (12) can be used to determine $\kappa_{critical}$. As previously described, FIG. 6B depicts $\kappa_{critical}$ versus $\Delta\omega$ for different $\gamma_2$; for constant $\Delta\omega$, a larger coupling factor is required to enter the exact phase as the loss factor increases.

FIGS. 7A-7D show modes normalized for $\omega_2$ while $\omega_1$ varies, consistent with various embodiments of the present disclosure. Surprisingly, mathematical analysis of the resonance-imbalanced system yields unintuitive/anti-intuitive results. The resulting real modes and their corresponding gains can be plotted in order to ascertain system performance. First, consider FIG. 7A, where it shown that mode-splitting occurs at some new $\kappa_{critical}$ (predicted by FIG. 6B). Now, the system undergoes a discontinuous bifurcation, where the first mode has a continuous behavior before and after $\kappa_{critical}$, while the second and the third modes start at approximately $\omega_2+|\gamma_2|$. The modes are denoted by $\omega+$, $\omega_m$, and $\omega-$ such that $\omega+>\omega_m>\omega-$. Two trends are noted from FIG. 7A: (1) as $\Delta\omega$ increases, the bifurcation point happens

TABLE 3

Real and imaginary parts of each mode in different scenarios for the PT-asymmetric case

| | $\gamma_1 < |\gamma_2|$ | $\gamma_1 > |\gamma_2|$ |
|---|---|---|
| $\beta < 0$ | $Re\{\omega\} = \frac{\omega_1+\omega_2}{2}+\sqrt{\frac{\sqrt{\alpha^2+\beta^2}+\alpha}{2}}$ | $Re\{\omega\} = \frac{\omega_2+\omega_2}{2}-\sqrt{\frac{\sqrt{\alpha^2+\beta^2}+\alpha}{2}}$ |
| | $Im\{\omega\} = \frac{\gamma_1+\gamma_2}{2}+\sqrt{\frac{\sqrt{\alpha^2+\beta^2}-\alpha}{2}}=0$ | $Im\{\omega\} = \frac{\gamma_1+\gamma_2}{2}-\sqrt{\frac{\sqrt{\alpha^2+\beta^2}-\alpha}{2}}=0$ |
| $\beta > 0$ | $Re\{\omega\} = \frac{\omega_1+\omega_2}{2}-\sqrt{\frac{\sqrt{\alpha^2+\beta^2}+\alpha}{2}}$ | $Re\{\omega\} = \frac{\omega_1+\omega_2}{2}+\sqrt{\frac{\sqrt{\alpha^2+\beta^2}+\alpha}{2}}$ |
| | $Im\{\omega\} = \frac{\gamma_1+\gamma_2}{2}+\sqrt{\frac{\sqrt{\alpha^2+\beta^2}-\alpha}{2}}=0$ | $Im\{\omega\} = \frac{\gamma_1+\gamma_2}{2}-\sqrt{\frac{\sqrt{\alpha^2+\beta^2}-\alpha}{2}}=0$ |

FIG. 6A shows an example of mode-splitting behavior and gain/loss ratio of tuned resonance circuits, consistent with various embodiments of the present disclosure. More specifically, the graph of FIG. 6A illustrates the Mode-splitting behavior and gain/loss ratio ($|\gamma_1/\gamma_2|$) for tuned resonance circuits $\omega_1=\omega_2=\omega_0$ with $\kappa_{critical}=0.01=|\gamma_2|$; all parameters are normalized by $\omega_0$.

at a larger $\kappa$ in agreement with FIG. 6B, and (2) assuming $\Delta\omega>0$, i.e., $\omega_1>\omega_2$, after the bifurcation point one can observe $\omega+>\omega_1$ and $\omega-<\omega_1$ (similar to the PT-Symmetric case). The mid-frequency mode, $\omega_m$, approaches $\omega_2$ for large $\kappa$.

Figure 7A:
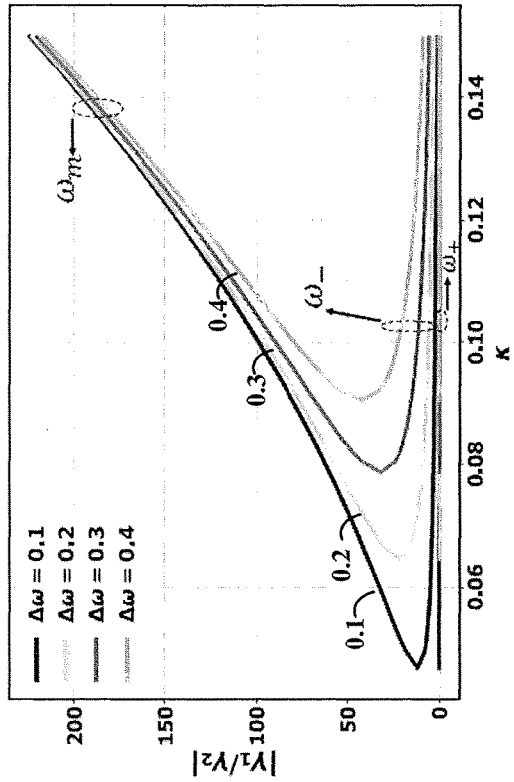
FIGS. 7A-7D show modes normalized for $w_2$ while $w_1$ varies, consistent with various embodiments of the present disclosure.
Figure 7B:
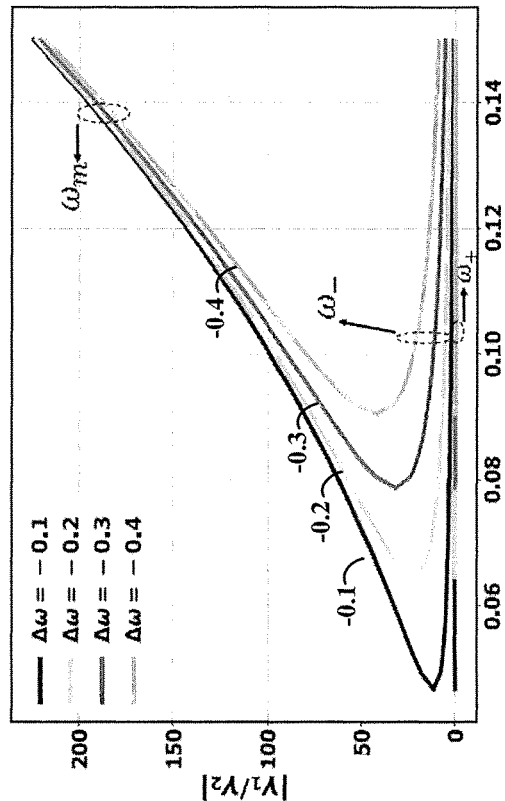
Figure 8A:
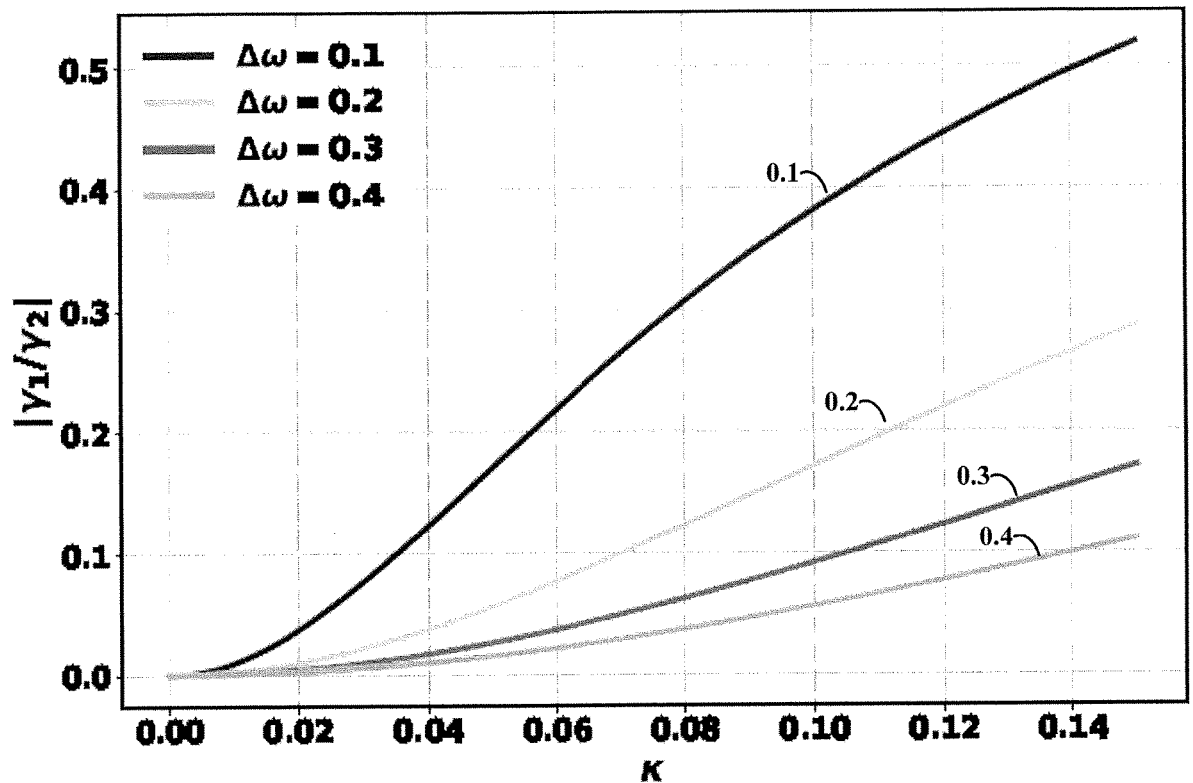
FIGS. 8A-8B illustrate example ratios of the required gain to loss and the self-oscillating mode as a function of coupling and change in $\Delta w$ showing the mode switching (frequency jump), consistent with various embodiments of the present disclosure.

The required gain ratio corresponding to each real mode is plotted in FIG. 7B assuming $\gamma_2=-0.01$ (Q=50). Interestingly, modes have unequal required gains, with $\omega-$ requiring a smaller gain for $\Delta\omega>0$, whose required gain ratio is plotted in FIG. 8A. As shown by FIGS. 7B and 8A, as $\Delta\omega$ increases, $\omega+$ has a higher gain than $\omega-$ for the same $\kappa$.

Figure 7C:
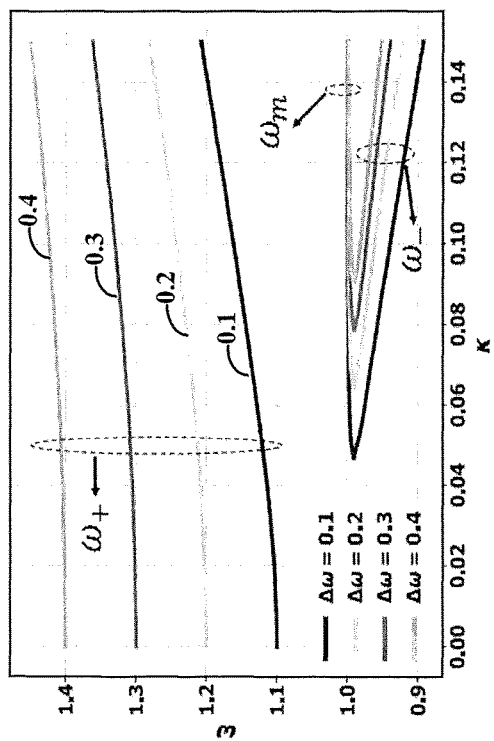
Figure 7D:
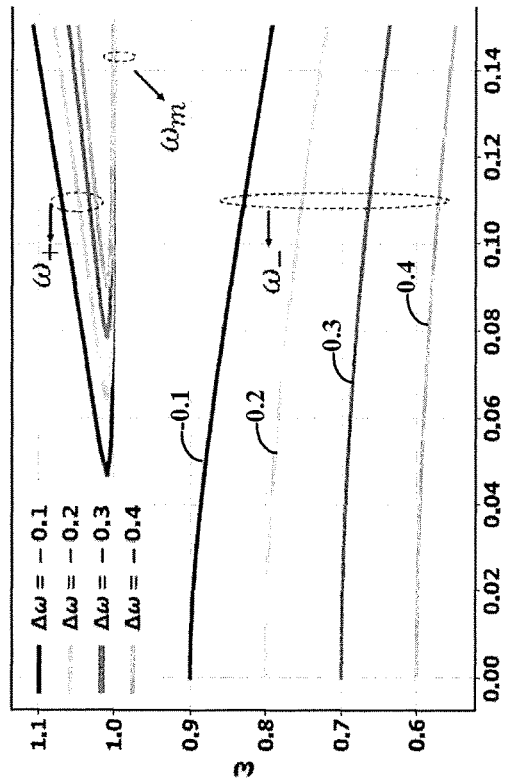

The above-used exemplary plots can be repeated for $\Delta\omega<0$, as illustrated respectively by FIGS. 7C and 7D. Similarly, when $\kappa<\kappa_{critical}$ only $\omega+$ emerges. Once again, past the new $\kappa_{critical}$, bifurcation occurs; the required gain corresponding to each mode also switches, since $\omega-$ now requires a higher gain than $\omega+$. The required gain for $\omega+$, when $\Delta\omega<0$ follows the same behavior as that for $\omega-$ when $\Delta\omega>0$; therefore FIG. 8A with $\Delta\omega<0$ shows the same behavior. This observation can be explained by $\omega_2=\omega_1+\Delta\omega$ and which shows that the modes may be written as:

$$\omega = \omega_1 + \frac{\gamma_1}{\gamma_1 + \gamma_2}\Delta\omega. \quad (11)$$

Inverting the sign of $\Delta\omega$ does not alter the required gains (roots), leaving the ratio $\gamma_1/(\gamma_1+\gamma_2)$ unchanged. The derivation shows that $|\gamma_1|$ (which determines the dominant mode) is always smaller than $\gamma\gamma_2|$ for $\kappa\ll 1$, resulting in $\gamma_1/(\gamma_1+\gamma_2)<0$. If $\omega_2>\omega_1$, the resulting mode is smaller than $\omega_1$, and vice versa. The behavior is independent of $\kappa$ so long as $\kappa>\kappa_{critical}$.

As further described below, the system can select the mode with the lowest required gain, which is referred to as the self-oscillating mode. According to various embodiments, the remote sensing system starts sweeping either one of $\omega_1$ or $\omega_2$, if $\omega_1>\omega_2$, the self-oscillating mode is larger than $\omega_1$ and vice versa. Monitoring the self-oscillating mode provides a method to detect the onset of PT-symmetry ($\omega_1=\omega_2$), forming the basis of the sensing mechanism in accordance with various embodiments. The gain mechanism of the reader apparatus can be automatically or manually adjusted so as to provide only the required amount of gain and completely cancel the loss presented to the gain side.

Figure 8B:
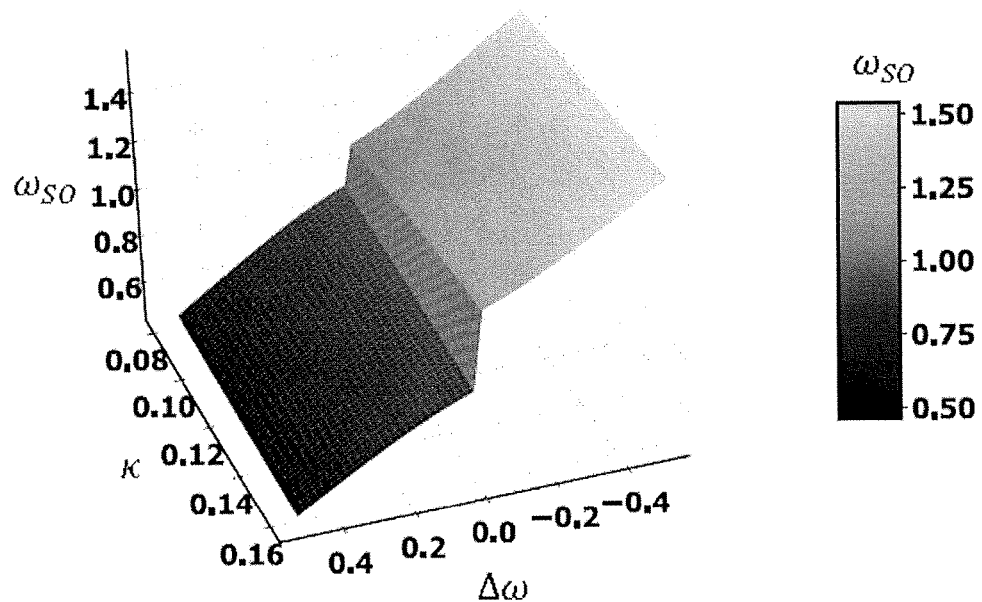

FIGS. 8A-8B illustrate example ratio of gain to loss and the self-oscillating mode as a function of coupling and change in $\Delta\omega$, consistent with various embodiments of the present disclosure. More specifically, FIG. 8A show the ratio of the gain to loss ($|\gamma_1/\gamma_2|$) for the first mode ($\omega-$) with positive $\Delta\omega$. As shown by FIG. 8B, the graph illustrates the self-oscillating mode, $\omega_{SO}$, as a function of coupling ($\kappa>\kappa_{critical|\Delta\omega=0.4}$) and $\Delta\omega$. The mode switching at $\Delta\omega$ is clearly seen.

Figure 9A:
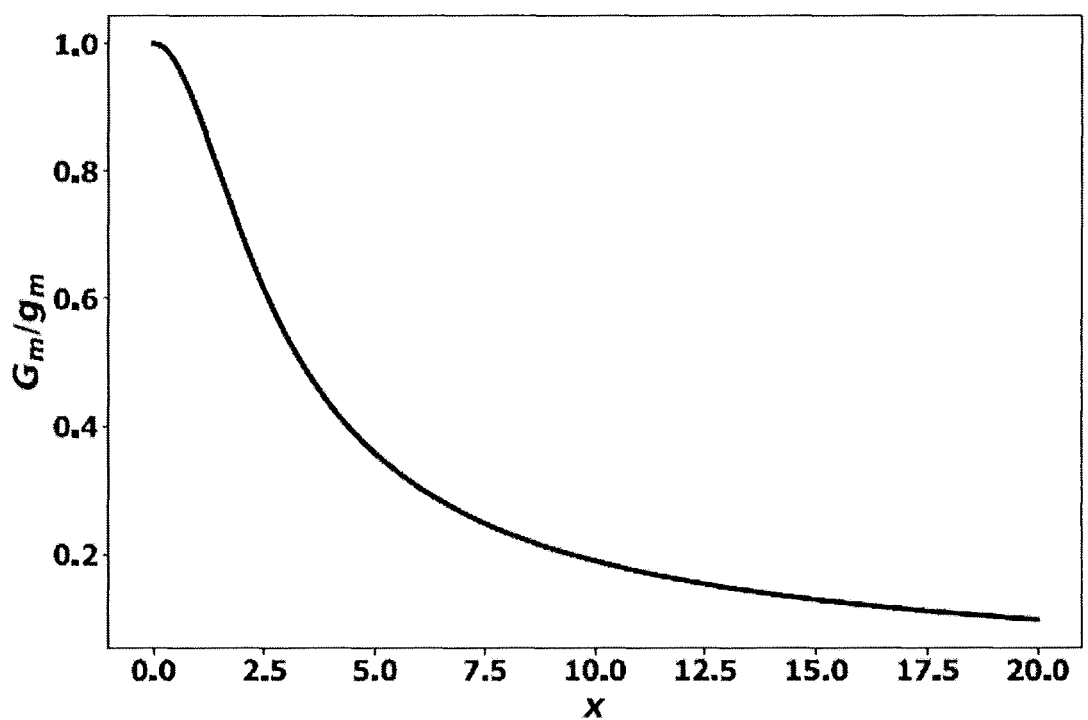
FIGS. 9A-9B illustrate various graphs associated with negative resistance circuits of a reader apparatus, as previously illustrated by FIGS. 3A-3B, consistent with various embodiments of the present disclosure.
Figure 9B:
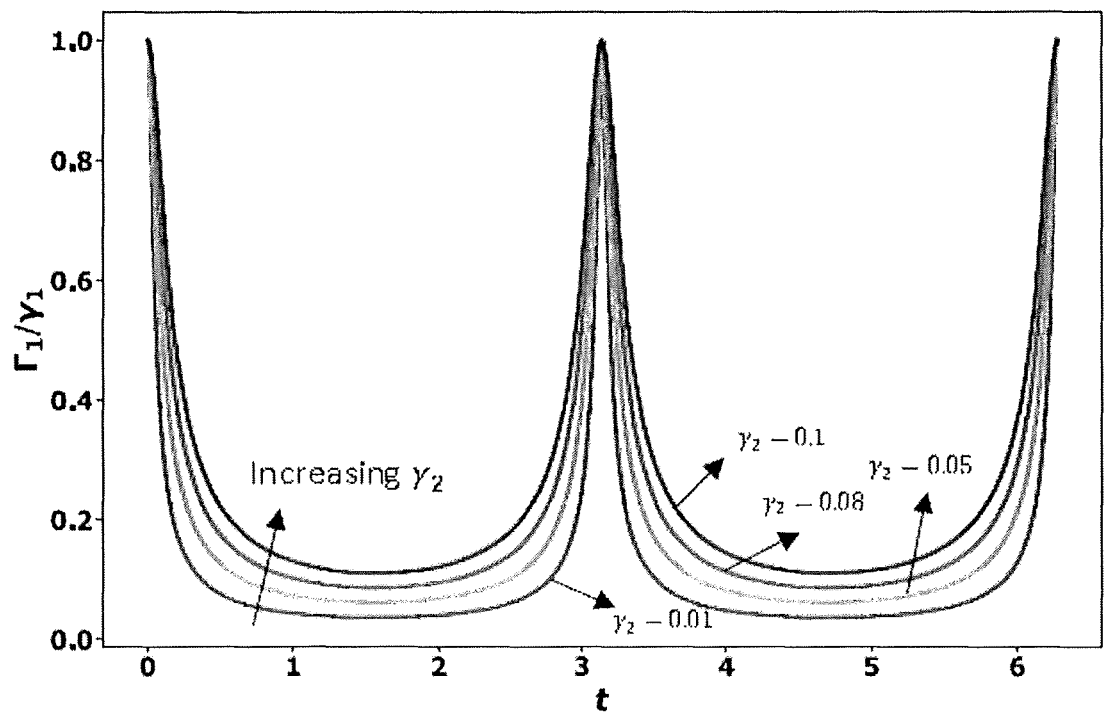

FIGS. 9A-9B illustrate various graphs associated with negative resistance circuits of a reader apparatus, as previously illustrated by FIGS. 3A-3B, consistent with various embodiments of the present disclosure. FIG. 9A, more specifically, is a graph illustrating the ratio of $G_m/g_m$ as a function of $x=V_{od}/V_T$, where $V_{od}$ is the output differential swing, and FIG. 9B is a graph illustrating the ratio of $\Gamma_1\gamma_1$ as a function of time during one period of $\alpha_1$ with $\omega_0=1$ rad/s for the PT-symmetric case. $\Gamma_{1, avg}/\gamma_1$ is equal to 0.107, 0.16, 0.21, 0.25 for $\gamma_2$ equal to 0.01, 0.05, 0.08, and 0.1, respectively.

As previously described, a gain mechanism can be provided by negative resistance circuitry. In many instances, the gain mechanism or equivalently the negative resistance can implemented using a negative impedance converter, in which an operational amplifier (opamp) is placed in positive feedback to exhibit a negative input resistance. For example, a single transistor negative resistance is employed based on the widely employed Colpitts oscillator where the circuit structure presents a frequency-dependent negative resistance along with a capacitive component. This structure does not lend itself to use in parallel RLC circuits where a fully symmetric (differential) is used. As previously illustrated by FIGS. 3A-3B, the negative resistance circuitry can include two cross-coupled transistors. $Q_1$ and $Q_2$, as shown in FIGS. 3A and 3B, of the cross-coupled pair of transistors are assumed to be identical (e.g., bipolar/NPN transistors manufactured in the same lot and as defined by a common set of transistor specifications or the lot). As described above, the calculated three modes and three required gain values are calculated corresponding to each. The gain is synonymous to the amount of loss which is presented from reader apparatus and the passive sensor circuitry and the negative resistance, which is denoted by $\gamma_{2,eff}$. The amplitude of the reader apparatus can be written in the time domain as shown by FIGS. 9A and 9B as:

$$a_1(t) = a_1(0)\left(e^{\left(\frac{\gamma_{in}+\gamma_2}{2} - \sqrt{\frac{\sqrt{\alpha^2+\beta^2}-\alpha}{2}}\right)t} e^{i\left(\frac{\omega_1+r_2}{2} + \sqrt{\frac{\sqrt{\alpha^2+\beta^2}+\alpha}{2}}\right)t} + e^{\left(\frac{\gamma_{in}+\gamma_2}{2} + \sqrt{\frac{\sqrt{\alpha^2+\beta^2}-\alpha}{2}}\right)t} e^{i\left(\frac{\omega_1+\omega_2}{2} - \sqrt{\frac{\sqrt{\alpha^2+\beta^2}+\alpha}{2}}\right)t}\right) \quad (12)$$

where $\alpha_1(0)$ is the initial condition on the reader apparatus. The terms with real exponents determine the amplitude in equation (12). The leftmost term contributes two modes, one of which is the anti-resonance mode, and the rightmost term contributes one. Here, $\gamma_{in}$ is the gain rate corresponding to the negative resistance and can be defined as $\gamma_{in}=Z_{0,1}g_m/2$, which can considered as a small signal value. As $a_1$ grows, non-linearities manifest themselves and we can no longer use the small-signal transconductance to calculate the gain rate.

An equivalent large signal transconductance, $G_m$, is introduced to analyze the compressive behavior of the gain rate. It can be shown that so long as $|V_{od}|<3V_T$, where $V_{od}$ is the differential output voltage swing and $V_T=kT/q$, the transistors remain in the forward-active region, each carrying around half $I_{EE}$, and in the regime, $G_m=I_{EE}/nV_T$. Beyond this point, one transistor remains in the forward active region, taking all the current while the other one goes into the cut-off region. The current through the transistor in the active region is now fixed by the current source, $I_{EE}$. In that case, an average large signal transconductance can be defined in the terms of the modified Bessel functions as:

$$G_m = g_m \frac{2I_1(x)}{xI_0(x)} \quad (13)$$

where $x=v_{out}/V_T$, and $I_n(x)$ is the modified Bessel function of order n. The ratio of $G_m/g_m$ is shown by FIG. 9A a function of x. As shown by FIG. 9B, as the amplitude grows larger (larger x), the effective transconductance decreases, which is equivalent to a larger negative resistance. Due to this non-linearity, the system has a time-varying gain rate. A large signal gain rate is defined as $\Gamma_{in}=Z_{0,1}G_m/2$. Therefore:

$$\Gamma_{in} = \gamma_{in} \frac{2I_1(x)}{xI_0(x)} \quad (14)$$

where x can be related to $\alpha_1$ by $$x = \sqrt{\frac{2}{C_1}} \frac{a_1(t)}{V_T}.$$

Figure 10:
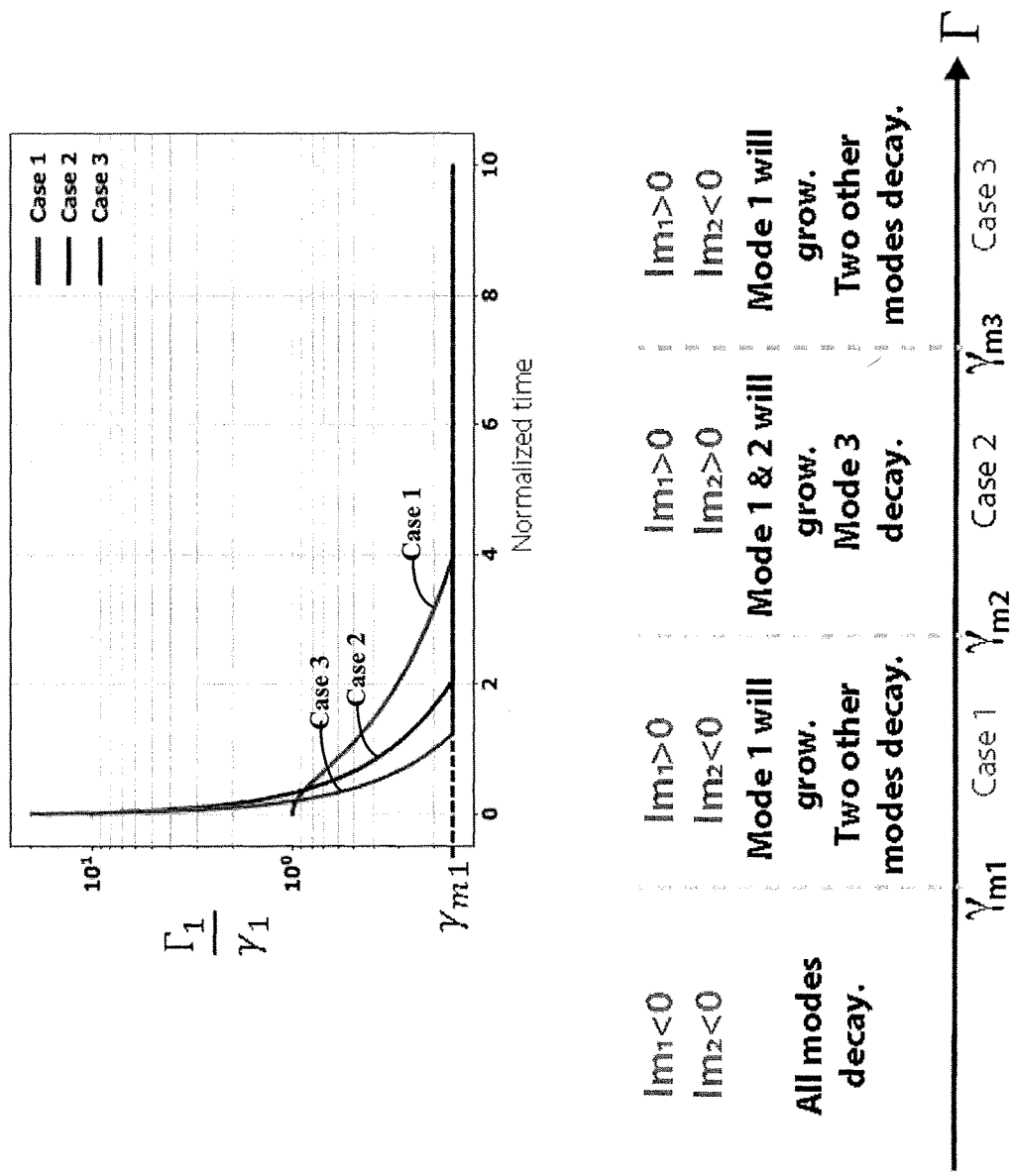
FIG. 10 illustrates an example involving three different cases (depending on the choice of the initial negative resistance) involving remote sensing systems having reader apparatuses, consistent with embodiments of the present disclosure.

The gains for each mode are denoted by $\gamma_{m1}$, $\gamma_{m2}$, $\gamma_{m3}$, and are assumed to be written in increasing order. Three cases can be considered depending on the choice $\Gamma_{in}$ with respect to the three roots. For brevity, the non-complex exponential in the first term of equation shown below is denoted by $Im_1$ and that of the second term, with $Im_2$. FIG. 10 summarizes these three cases and which are further summarized below as:
1. $\gamma_{m1} < \Gamma_{in} < \gamma_{m2}$, $\gamma_{m3}$: In this case, $Im_1 > 0$ and $Im_2 < 0$, therefore the mode corresponding to $\gamma_{m1}$ grows while the other two decay. When $\alpha_1$ is small, $\Gamma_{in}(\alpha_1)$ has its maximum value, $\gamma_{in}$. As $\alpha_1$ builds up, the value of $\Gamma_{in}(\alpha_1)$ decreases owing to the compressive behavior of the gain mechanism, which reduces the rate of build-up in $\alpha_1$ until steady-state is reached when $\Gamma_1 = |\gamma_{2,eff}|$.
2. $\gamma_{m1} < \gamma_{m2} < \Gamma_{in} < \gamma_{m3}$: In this case, $Im_1 > 0$ and $Im_2 > 0$. Therefore, the first two modes start to grow however the growth rate due to the first mode is faster since $Im_1(\Gamma_{in}) > Im_2(\Gamma_2)$. As a result, $G_m$ gets saturated due to the first mode before it reaches $\gamma_{m2}$, yielding the mode with the lower $\gamma_{eff}$.
3. $\gamma_{m1} < \gamma_{m2} < \gamma_{m3} < \Gamma_{in}$: In this case, $Im_1 > 0$ and $Im_2 < 0$, and for all $\Gamma_{in}$, there is $Im_1(\Gamma i_n) > Im_2(\Gamma_2)$. Therefore, similar to the other two cases, the mode with the smallest required gain emerges.

In accordance with various experimental embodiments, the mode with the highest required gain never grows up, even in the transient. This is expected, since as mentioned earlier this mode corresponds to the anti-resonant mode of the two coupled resonance circuits.

FIG. 10 illustrates an example of different use cases of remote sensing systems having reader apparatuses, consistent with embodiments of the present disclosure, and as described above.

As previously described, in various embodiments, the reader apparatus can include negative resistance circuits that are in series with or parallel to the resonance circuit, as illustrated by FIGS. 4A-4D. Having discussed the saturating negative resistance gain mechanism, the following is a brief generalization of its equivalent source model for general series and parallel resonance topologies. For a moment, ignore the nonlinear saturation; in this linearized case, a negative resistance is essentially the dual of a traditional, positive resistance. While the positive resistance absorbs power proportional to the load it presents, a negative resistance supplies power proportional to the load it presents. In this sense, neither a positive nor a negative resistance are fundamentally different when they are in either a series or parallel topology.

The saturating nonlinearity, however, presents a subtle difference for the series vs. parallel circuit topologies. Gain saturation may occur through either voltage or current saturation; which type of saturation is allowed, however, does depend primarily on the circuit topology. Consider the series resonance circuit previously described by FIG. 4A; if the negative resistance source is a voltage saturating source, the generated current experiences a sudden and sharp discontinuity as the voltage saturates (due to the internal voltage polarities in the negative resistance source). Since this current is common to the entire series branch, the inductor's current changes instantaneously; since $$v_L = L \frac{di_L}{dt} = \infty$$

this is not physically allowed and therefore, a series resonance circuit cannot support a voltage-saturating negative resistance. A parallel resonance circuit, however can support a voltage-saturating negative resistance as the capacitor and inductor current are out of phase. The capacitor branch can then handle sharp discontinuities in current, sharing them with the negative resistance branch. The converse is also true. For example, because a capacitor's voltage cannot experience a large discontinuity $$\left( i_C = C \frac{dv_C}{dt}, \text{ FIG. 4B} \right),$$

a current saturating topology may not be used in a parallel resonance circuit; it may, however, be used in a series resonance circuit.

An equivalent circuit model can also depend on the saturation method. First, considering an analogy to a positive resistance; if a positive resistance has a defined voltage amplitude $v_R$ across it, the current amplitude flowing through is $$i_R = \frac{v_R}{R}.$$

Likewise, in steady state, a voltage-saturated negative resistance provides a current with amplitude $$i_{\_R} = \frac{v_{sat}}{|-R|};$$

this is a voltage-controlled current source (VCCS). Just as a positive resistance with defined current amplitude has a voltage amplitude $v_R = i_R R$, a current-saturated negative resistance provides a voltage amplitude $v_{-R} = i_{sat}|-R|$; this is a current controlled voltage source (CCVS).

Figure 11A:
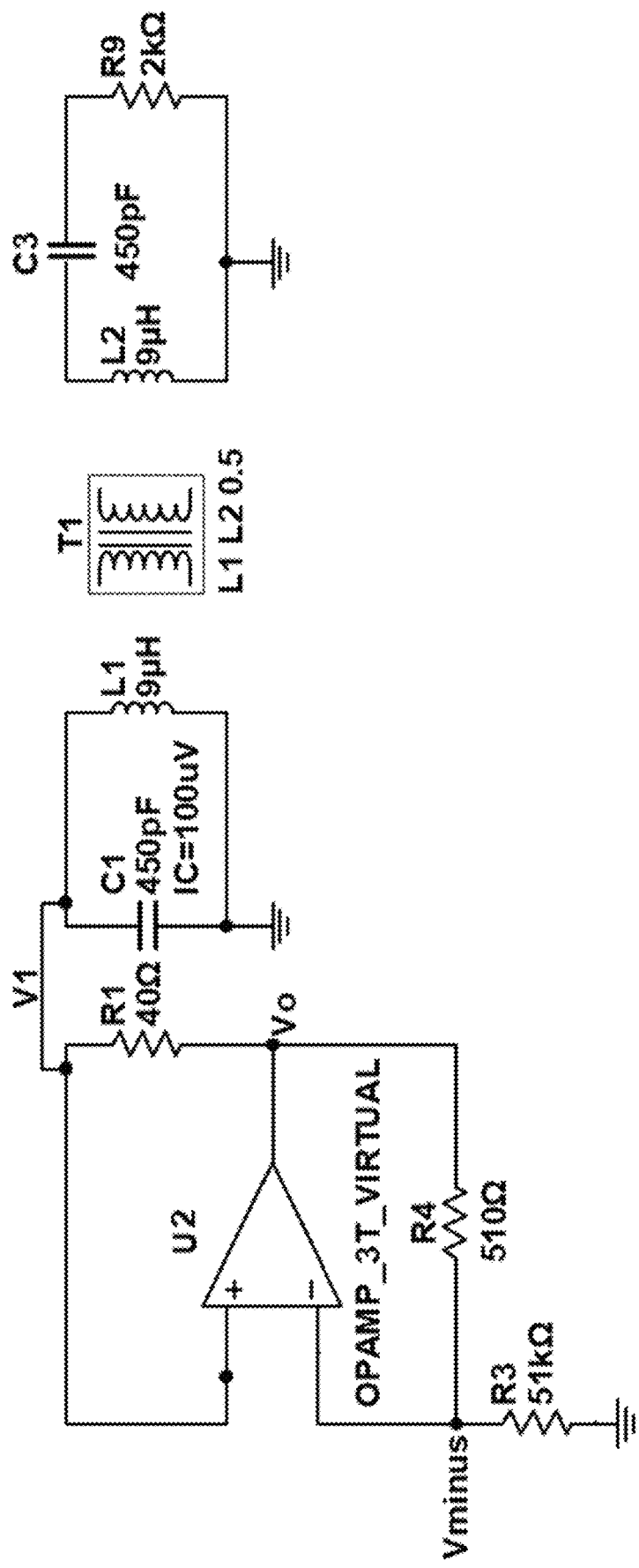
FIGS. 11A-11B illustrate an example reader apparatus and resulting stimulation, consistent with embodiments of the present disclosure.
Figure 11B:
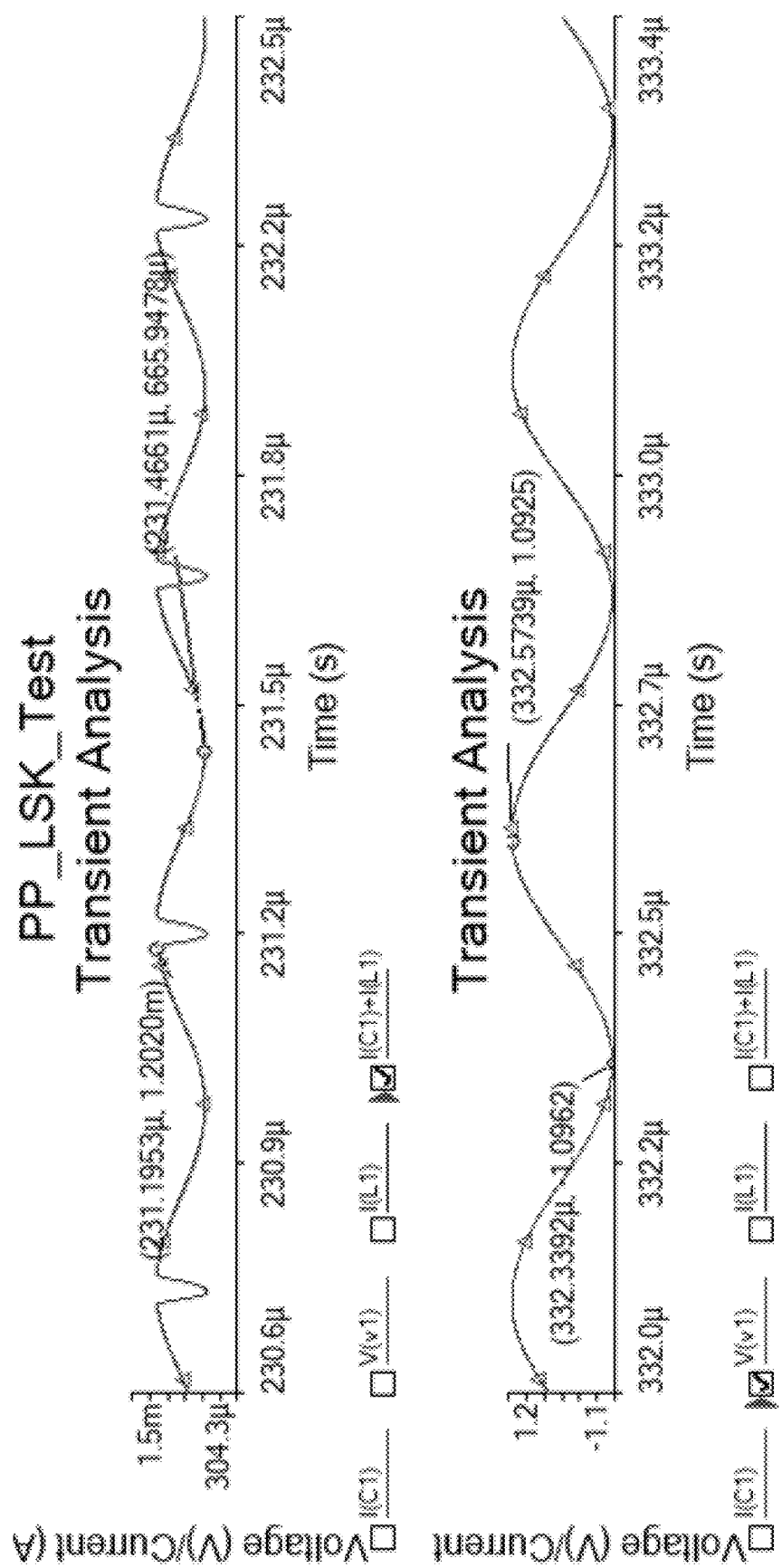

FIGS. 11A-11B illustrate an example reader apparatus and resulting stimulation, consistent with the above and yet other embodiments of the present disclosure. More specifically, FIG. 11A illustrates an example reader apparatus used to verify the above in Spice. Using a calculation of $$\frac{v_s at}{|-R|} = 547.2 \text{ μA} \approx i_{\_R,pp} = 536.05 \text{ μA};$$

wherein $i_{-R,pp}$ is the approximate peak-to-peak current amplitude across the negative resistant circuitry. FIG. 11B shows the resulting transient simulation of negative resistance current and voltage. As previously described, FIGS. 4C-4D illustrate the final equivalent voltage and current-saturated models, respectively.

Various mores specific embodiments are directed to a triple resonance circuit system. In order to decompose equation (5) into its imaginary and real part, the imaginary and real part of the term are found under the square root. Using equations (8a)-(8b), the term is rewritten under the square root as $$\alpha + i\beta = \sqrt{\alpha^2 + \beta^2}\, e^{i\tan^{-1}\left(\frac{\beta}{\alpha}\right)}.$$

Then, $$\sqrt{\left(\frac{\Delta\omega}{2}\right)^2 - \left(\frac{\Delta\gamma}{2}\right)^2 + \kappa^2 + i\frac{\Delta\omega\Delta\gamma}{2}} = \sqrt{\alpha + i\beta} = (\alpha^2 + \beta^2)^{\frac{1}{4}} e^{i\frac{\tan^{-1}\left(\frac{\beta}{\alpha}\right)}{2}}. \quad (15)$$

Now, denote $$\theta = \frac{\tan^{-1}\left(\frac{\beta}{\alpha}\right)}{2},$$

$$\frac{\beta}{\alpha} = \tan(2\theta). \quad (16)$$

This can be simplified to:

$$(\alpha^2+\beta^2)^{1/4} e^{i\theta} = (\alpha^2+\beta^2)^{1/4} \cos\theta + i(\alpha^2+\beta^2)^{1/4} \sin\theta. \quad (17)$$

Using equation (16), and noting that, $1+\tan^2(2\theta)=1/\cos^2(2\theta)$, the following:

$$\cos(2\theta) = \frac{\alpha}{\sqrt{\alpha^2+\beta^2}}. \quad (18)$$

Now, $\cos(2\theta)=2\cos^2\theta-1=1-2\sin^2\theta$, resulting in:

$$\cos\theta = \begin{cases} \dfrac{1}{(\alpha^2+\beta^2)^{\frac{1}{4}}}\sqrt{\dfrac{\sqrt{\alpha^2+\beta^2}+\alpha}{2}}, & \beta \geq 0 \\ -\dfrac{1}{(\alpha^2+\beta^2)^{\frac{1}{4}}}\sqrt{\dfrac{\sqrt{\alpha^2+\beta^2}+\alpha}{2}}, & \beta \leq 0 \end{cases} \quad (19)$$

$$\sin\theta = \frac{1}{(\alpha^2+\beta^2)^{\frac{1}{4}}}\sqrt{\frac{\sqrt{\alpha^2+\beta^2}-\alpha}{2}}. \quad (20)$$

Equation (19) shows that correct sign for the real part depends on the sign of $\beta$, while the imaginary part is always positive. This is because the complex full circle representing $2\theta$ from $\alpha+j\beta$ transforms into the top half of the complex circle for $\theta$ (as further shown by FIG. 12).

Figure 12:
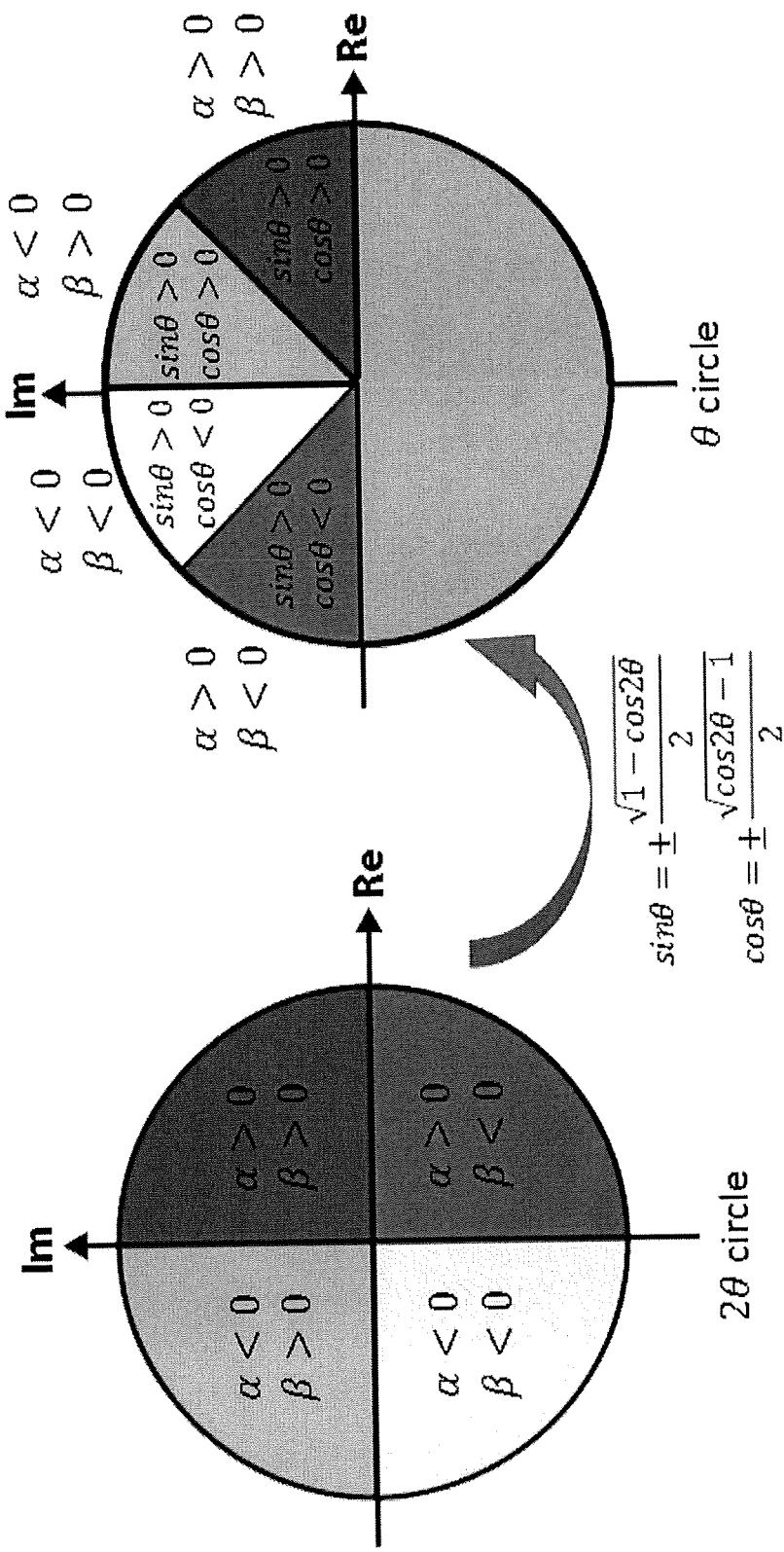
FIG. 12 illustrates an example of a complex circle and its transformation to a complex half-circuit, consistent with example embodiments of the present disclosure.

FIG. 12 illustrates an example of a complex circle and its transformation to a complex half-circuit, consistent with embodiments of the present disclosure. In the second half of the complex plane, the imaginary part is always positive, e.g., $\sin\theta>0$, while the real part changes sign depending on the sign of $\beta$. Thus:

$$(\alpha^2+\beta^2)^{\frac{1}{4}} e^{i\theta} = \begin{cases} \sqrt{\dfrac{\sqrt{\alpha^2+\beta^2}+\alpha}{2}} + i\sqrt{\dfrac{\sqrt{\alpha^2+\beta^2}-\alpha}{2}}, & \beta \leq 0 \\ -\sqrt{\dfrac{\sqrt{\alpha^2+\beta^2}+\alpha}{2}} + i\sqrt{\dfrac{\sqrt{\alpha^2+\beta^2}-\alpha}{2}}, & \beta \geq 0 \end{cases} \quad (21)$$

The following provides for the discriminate of equation (5). For a general cubic equation of the form $ax^3+bx^2+cx+d=0$ with $a\neq 0$, the discriminate can be defined as:

$$\Delta=18abcd-4b^3d+b^2c^2-4ac^3-27a^2d^2, \quad (22)$$

which determines the numbers of real and complex roots. If $\Delta>0$, then the equation has three distinct real roots. If $\Delta=0$, then the equation has a multiple root and all of its roots are real. Finally, if $\Delta<0$, then the equation has one real root and two non-real complex conjugate roots. Therefore, $\Delta 0$ serves as an indicator of mode-splitting. For Eq. 5:

$$a=\gamma_2 \quad (23a)$$

$$b=2\gamma_2^2+\kappa^2 \quad (23b)$$

$$c=\gamma_2^3+\Delta\omega^2\gamma_2+2\kappa^2\gamma_2 \quad (23c)$$

$$d=\kappa^2\gamma_2^2. \quad (23d)$$

Other embodiments or features, which can be used alone or in combination with the embodiments and/or features discussed herein, are characterized in the collective disclosure provided by way the above aspects features used individually and/or in any of a plurality of combinations. As examples and in part as a summation of some of the above uses of the above examples, certain specific embodiments consistent with aspects of the instant disclosure can be used in connection with a suite of different stretchable and wearable health monitoring and tracking sensors, a personal health body area network of sensors can be realized and supported using conventional data communications technology. Other implementations consistent with the instant disclosure may be used in food-safety applications, where sensors can be designed to contain information about how well the product is handled or stored in transportation. Shoppers can use the proposed reader to interrogate the sensor and access the required information. In this case, the reader can be designed as a thin sticker attached to the smartphone which communicates directly to the phone and is powered using the (e.g., NFC) radio-frequency waves from the smartphone. This approach can also be used to measure the coupling strength between the sensor and the reader, which translates into information about the distance of the two.

Monitoring the change of coupling factor can give information about how a sensor has moved relative to the reader which can be used in gesture detection scenarios, where the reader circuitry can be embedded in the workspace (e.g. in the keyboard, touch-pad, or a similar mat). The user will wear a glove which contains one sensor on each finger. The reader will then couple to each sensor through inductive coupling and can extract certain gestures of the user. Coupled with machine learning, this gesture recognition technology can be used as a much simpler and economical replacement for short-range radar technology. In addition, implementations consistent with the instant disclosure have sensing systems configured, for example, as a handheld reader plus an integrated sensor, for use in a variety of other smart sensing applications. Such applications include, as examples, internet-of-things (IOTs), emerging ubiquitous device-to-device connectivity and smart home applications, asset tracking, smart agriculture, smart retail, and activity tracking.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions. Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches disclosed in connection with the Figures (e.g., FIGS. 2A, 3A-3B, and 11). In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described herein is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first resonance circuit", a "second resonance circuit, etc., where the resonance might be replaced with terms such as "circuit", "circuitry" and others, the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

While various embodiments discussed herein are amenable to modifications and alternative forms, aspects thereof have been shown by way of example in the drawings and will be described in detail. As one of many examples, it will be appreciated that different structures, shapes and materials can be used, and that combinations of the above-described aspects and features can be implemented for additional embodiments and for realizing related advantages. It should be understood, however, that the intention is not to limit the disclosures to the particular embodiments described. On the contrary, the intention is to cover all modifications, equivalents, and alternatives falling within the scope of the disclosure including aspects defined in the claims.

What is claimed is:

1. An apparatus comprising:
a first resonance circuit, a second resonance circuit, and inductive-coupling circuitry respectively associated with the first and second resonance circuits to cause an inductively-coupled oscillating signal to be swept over a range of frequencies and, in response, to cause a jump or sudden transition in a frequency of an oscillating signal while the first and second resonance circuits are inductively-coupled; and a data communication circuit communicatively coupled with the inductive-coupling circuitry to convey or communicate data between the first and second resonance circuits by way of or in response to the jump or sudden transition in the frequency of the oscillating signal indicating a resonance condition involving the first and second resonance circuits.

2. The apparatus of claim 1, further including a reader and a sensor respectively including the first resonance circuit and the second resonance circuit, wherein the sensor is to indicate when data may be obtained via the inductively-coupled oscillating signal, and wherein the jump or sudden transition in a frequency of an oscillating signal corresponds to a resonance condition involving the first and second resonance circuits.

3. The apparatus of claim 1, wherein the communication circuit is part of one of the first and second resonance circuits and is configured to send data to the other of the first and second resonance circuits while the first and second resonance circuits are inductively-coupled.

4. The apparatus of claim 1, wherein the first and second resonance circuits is respectively associated with a reader and a sensor, and wherein one of the reader and a sensor is to initiate the inductively-coupled oscillating signal to be frequency swept, and wherein the data communication circuit is to communicate the data between the first and second resonance circuits in further response to a timing parameter.

5. The apparatus of claim 1, wherein the first and second resonance circuits is respectively associated with a reader and a sensor, and wherein one of the reader and a sensor is to initiate the inductively-coupled oscillating signal to be frequency swept, and wherein the data communication circuit is to communicate the data between the first and second resonance circuits in further response to a set of inductively-related parameters.

6. The apparatus of claim 1, wherein the data communication circuit is to convey or communicate data between the first and second resonance circuits in response to a mismatched frequency and/or phase due to a difference between gain and loss exhibited by the inductively-coupled oscillating signal and/or in response to a change in a degree of symmetry in a resonance frequency associated with a change in distance between the first and second resonance circuits.

7. The apparatus of claim 1, wherein the first resonance circuit is part of or associated with a reader and the second resonance circuit is part of or associated with a set of sensors including a first sensor and a second sensor, the first sensor and the second sensor being cooperatively configured with the first resonance circuit to resonate at respective sensor-specific frequencies in response to the inductively-coupled oscillating signal being frequency swept, wherein each of the first sensor and the second sensor is to communicate data to the reader in response to the respective sensor-specific frequencies being resonant.

8. The apparatus of claim 1, wherein the first resonance circuit is part of or associated with a reader and the second resonance circuit is one sensor of a set of a plurality of health-indicative sensors, each of the plurality of sensors including a wearable/implant biological-parameter sensor to measure or respond to at least one of the following biological parameters: cardiac-related pressure, pulmonary-related pressure, biological temperature, and biological sweat.

9. The apparatus of claim 1, wherein the first resonance circuit is part of or associated with a reader and the second resonance circuit is one sensor of a set of a plurality of sensors, each of the plurality of sensors configured to be secured to apparel or material of a bed and to include a rest and/or sleep monitor sensor to measure or respond to at least one of the following biological parameters:

cardiac-related pressure, pulmonary-related pressure, and biological temperature, biological sweat.

10. The apparatus of claim 1, wherein the first resonance circuit is part of or associated with a reader and the second resonance circuit is one sensor of a set of a plurality of sensors, each of the plurality of sensors configured to be secured to a food package/container and to include a sensor to indicate a food safety/health condition via at least one of the following parameters: temperature, food ripeness, spoilage, and chemical irregularity.

11. The apparatus of claim 1, wherein the first resonance circuit is part of or associated with a reader and the second resonance circuit is one sensor of a set of a plurality of sensors, each of the plurality of sensors configured to be communicative with the reader and secured to a different parts of another apparatus, the other apparatus including one of: a food package/container; and a wearable that is secured to or positioned proximate a person's body for monitoring at least one biological parameter of the person's body.

12. The apparatus of claim 1, wherein
the first resonance circuit includes a first inductive element or inductive circuitry; and
the second resonance circuit includes a second inductive element or inductive circuitry, wherein the first and second resonance circuits are configured to be communicatively coupled via the first and second inductive elements or other inductive circuitry by way of the inductively-coupled oscillating signal, and the first resonance circuit is configured and arranged to cause the inductively-coupled oscillating signal to be swept over a range of frequencies while causing a resonance frequency associated with a capacitive value of the second inductive element or inductive circuitry and while the first and second resonance circuits are in sufficient proximity for inductively-coupling via the oscillating signal; and
a sensor, including the second resonance circuit, to sense a targeted environment by changing a capacitance value associated with the second inductive element or circuitry, in response to a change in the targeted environment.

13. The apparatus of claim 12, wherein the first resonance circuit includes a reader and is configured to interrogate other remotely-located resonance circuits, each of the other remotely-located resonance circuits being configured as a passive sensor circuit.

14. The apparatus of claim 12, wherein the second resistance circuit is to provide a negative resistance circuit and is configured with the first resonance circuit for exhibiting a gain in signals received by the first resonance circuit.

15. The apparatus of claim 12, wherein the first resonance circuit is coupled to the second resistance circuit to form an oscillator core to provide an inductance which couples with the sensor and to provide the inductively-coupled oscillating signal.

16. The apparatus of claim 12, wherein the first resonance circuit is coupled to the second resistance circuit to form an oscillator core to provide an inductance which couples with the sensor and to provide the inductively-coupled oscillating signal, and wherein the first resonance circuit includes a reader that includes varactors configured to sweep a frequency of the oscillator.

17. The apparatus of claim 16, wherein the reader includes the sensing circuitry and includes signal processing circuitry configured and arranged to obtain measurements of the frequency and to detect the jump in the measured frequency or amplitude, or to obtain data from the sensor at a frequency associated with the detected jump.

18. The apparatus of claim 12, wherein first resonance circuit is in parallel or in series with the second resistance circuit, and the second resistance circuit provides a negative resistance and includes an amplifier with positive feedback and/or a pair of cross-coupled transistors, wherein the sensor is one of a set of sensors to monitor the targeted environment, and wherein each said sensor has a different resonance circuit configured and arranged to exhibit loss and to resonate uniquely for identifying or distinguishing the sensor.

19. The apparatus of claim 1, wherein the oscillating signal is a self-oscillating or free-running signal.

20. A method comprising:
causing, via inductive-coupling in first and second resonance circuits, an inductively-coupled oscillating signal to be swept over a range of frequencies and, in response, to cause a jump or sudden transition in a frequency of an oscillating signal while the first and second resonance circuits are inductively-coupled; and
conveying data, via a data communication circuit and using the inductive- coupling, between the first and second resonance circuits by way of or in response to the jump or sudden transition in the frequency of the oscillating signal indicating a resonance condition involving the first and second resonance circuits.

21. The method of claim 20, wherein the first and second-resonance circuits have parity-time symmetry at the detected jump.

22. The method of claim 20, wherein the first and second resonance circuits respectively exhibit a match in terms of gain and loss relative to the jump.

23. An apparatus comprising:
a first resonance circuit, a second resonance circuit, and inductive-coupling circuitry respectively associated with the first and second resonance circuits to cause an inductively-coupled oscillating signal to be swept over a range of frequencies and, in response, to create a change in a signal parameter coupling between the first resonance circuit and the second resonance circuit while the first and second resonance circuits are inductively-coupled;
a data communication circuit communicatively coupled with the inductive- coupling circuitry to convey data between the first and second resonance circuits by way of or in response to the change in a signal parameter;
a reader including the first resonance circuit; and
a set of sensors
a first sensor having the first resonance circuit and to monitor a targeted environment or condition, and including
a second sensor having the second resonance circuit and to monitor another targeted environment or condition, wherein each of the first and second sensors has a different resonance circuit configured and arranged to exhibit loss and to resonate uniquely for identifying or distinguishing the sensor.

* * * * *